(12) United States Patent
Hattori et al.

(10) Patent No.: US 8,446,742 B2
(45) Date of Patent: May 21, 2013

(54) INVERTER CONTROL CIRCUIT AND INTERCONNECTION INVERTER SYSTEM HAVING THAT INVERTER CONTROL CIRCUIT

(75) Inventors: Nobuyuki Hattori, Osaka (JP); Noriyuki Morotomi, Osaka (JP); Daisuke Tsukiyama, Osaka (JP)

(73) Assignee: DAIHEN Corporation, Osaka (JP)

( * ) Notice: Subject to any disclaimer, the term of this patent is extended or adjusted under 35 U.S.C. 154(b) by 277 days.

(21) Appl. No.: 12/991,630

(22) PCT Filed: Jul. 13, 2009

(86) PCT No.: PCT/JP2009/062652
§ 371 (c)(1),
(2), (4) Date: Nov. 8, 2010

(87) PCT Pub. No.: WO2010/029808
PCT Pub. Date: Mar. 18, 2010

(65) Prior Publication Data
US 2011/0063883 A1    Mar. 17, 2011

(30) Foreign Application Priority Data

Sep. 11, 2008  (JP) ................. 2008-232838
Dec. 5, 2008   (JP) ................. 2008-310712

(51) Int. Cl.
*H02M 3/335*        (2006.01)
(52) U.S. Cl.
USPC .............................. 363/16; 363/56.01; 363/97

(58) Field of Classification Search
USPC ............... 363/16, 17, 55, 56.01, 95, 97, 131, 363/148
See application file for complete search history.

(56) References Cited

U.S. PATENT DOCUMENTS

| | | | | |
|---|---|---|---|---|
| 4,363,089 A * | 12/1982 | Wisman | ........................ | 363/137 |
| 5,077,652 A * | 12/1991 | Faley | ............................... | 363/97 |
| 5,264,823 A * | 11/1993 | Stevens | ......................... | 375/238 |
| 5,784,267 A * | 7/1998 | Koenig et al. | .................... | 363/43 |
| 7,768,800 B2 * | 8/2010 | Mazumder et al. | ............. | 363/17 |
| 8,259,468 B2 * | 9/2012 | Mallwitz | ......................... | 363/17 |

FOREIGN PATENT DOCUMENTS

| | | |
|---|---|---|
| JP | 2007-228745 | 9/2007 |
| JP | 2007-288858 | 11/2007 |

* cited by examiner

*Primary Examiner* — Adolf Berhane
(74) *Attorney, Agent, or Firm* — Hamre, Schumann, Mueller & Larson, P.C.

(57) ABSTRACT

An inverter control circuit (6) controls the operation of a plurality of switching elements in a three-phase inverter circuit (2) by a PWM signal. A phase voltage output from the three-phase inverter circuit (2) is outputted through a low-pass filter (3). A waveform of the phase voltage output from the low-pass filter (3) assumes the following waveforms through the control of the PWM signal. The waveform becomes zero in a first one-third period of a cycle; forms a sine wave corresponding to a phase from 0 to $2\pi/3$ in a second one-third period; and forms a sine wave corresponding to a phase from $\pi/3$ to $\pi$ in a remaining one-third period of the cycle. Such PWM signal cyclically includes a period where a pulse is not generated. Therefore, the switching action of the switching element is periodically stopped.

12 Claims, 21 Drawing Sheets

| Phase θ | U-phase | V-phase | W-phase |
|---|---|---|---|
| $-\frac{\pi}{6} \sim \frac{3}{6}\pi$ | Vuw | Vvw | 0 |
| $\frac{3}{6}\pi \sim \frac{7}{6}\pi$ | Vuv | 0 | Vwv |
| $\frac{7}{6}\pi \sim \frac{11}{6}\pi$ | 0 | Vvu | Vwu |

FIG.9
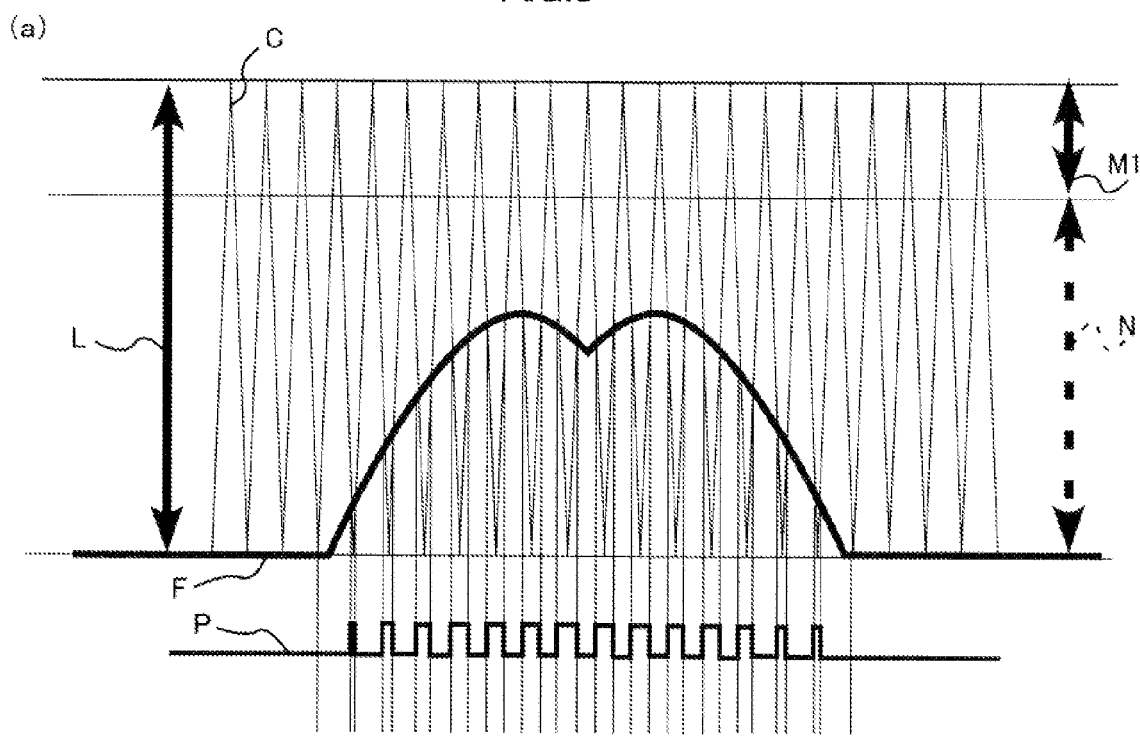
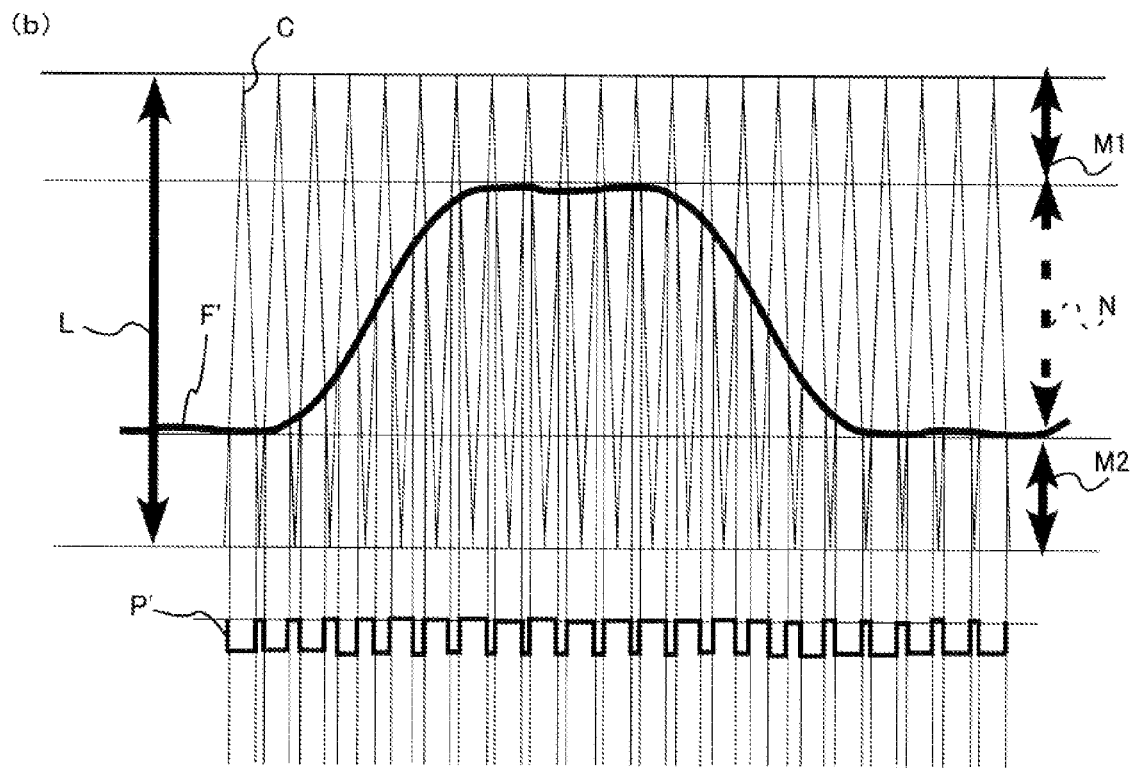

INVERTER CONTROL CIRCUIT AND INTERCONNECTION INVERTER SYSTEM HAVING THAT INVERTER CONTROL CIRCUIT

TECHNICAL FIELD

The present invention relates to an inverter control circuit for controlling a three-phase inverter circuit by a PWM signal, and it also relates to a utility interactive inverter system including such an inverter control circuit.

BACKGROUND ART

Utility interactive inverter systems have been developed for converting DC power generated by e.g. a solar battery into AC power to supply a three-phase power system with the AC power. A utility interactive inverter system generally employs a full-bridge three-phase inverter circuit. The full-bridge three-phase inverter circuit includes a bridge circuit constituted of three sets of serially connected two switching elements (hereinafter, such set will be referred to as "arm") connected in parallel, and is configured so as to obtain three outputs corresponding to U-phase, V-phase, and W-phase from the connection point between the switching elements of each of the arms. The three-phase inverter circuit converts each of phase voltage control signals (sine wave voltage signals of a phase shifted by 2π/3 from each other), representing a target output of each phase, into a PWM signal, and controls the on/off action of the switching elements of each arm of the inverter circuit with the PWM signal, thereby controlling an AC voltage signal to be output from the inverter circuit to U-phase, V-phase, and W-phase, respectively.

FIG. 22 is a block diagram for explaining an example of a utility interactive inverter system including a conventional inverter control circuit.

In the figure, the inverter circuit 2 in the inverter system A' is constituted of a full-bridge three-phase inverter circuit. To each arm of the bridge circuit in the inverter circuit 2, a DC voltage which is inputted from a DC power source 1 is applied. To the six switching elements in total, which consists of two switching elements provided in each arm, six PWM signals inputted from an inverter control circuit 6' are respectively input. The PWM signals control the on/off action of the six switching elements, so that the inverter circuit 2 outputs pulse AC voltage signals corresponding to U-phase, V-phase, and W-phase, respectively.

In FIG. 22, the signal line from the inverter control circuit 6' to the inverter circuit 2 is drawn with six oblique lines, which indicate the number of signal lines for the PWM signal. Thus, FIG. 22 means that six PWM signals are input to the inverter circuit 2 from the inverter control circuit 6' for the six switching elements.

The filter circuit 3 eliminates high-frequency components such as a switching noise from the three pulse AC voltage signals outputted from the inverter circuit 2. thereby converting the pulse AC voltage signals into sine wave-shaped AC voltage signals. Then the amplitude of the three sine wave AC voltage signals (corresponding to U-phase, V-phase, and W-phase) is adjusted by a transformer circuit 4, to be outputted to the corresponding phase in a system 5. In the inverter system A', each of the three phase voltage signals outputted from the transformer circuit 4 to the system 5 need to be matched with the AC voltage signal of the corresponding phase of the system 5. For this purpose, the inverter control circuit 6' generates the phase voltage control signal of the phases for representing the target output basically in accordance with the phase voltage signal of each phase of the system 5, to generate a PWM signal PSu by comparing the phase voltage control signal Su with a predetermined carrier signal (triangle wave signal) Sc, as shown in FIG. 23.

FIG. 23 illustrates the principle of generating the PWM signal PSu for a switching element constituting the arm corresponding to U-phase in the inverter circuit 2, by comparing the phase voltage control signal Su of U-phase with the carrier signal Sc, assuming the phase of U-phase as the reference. Since two switching elements are serially connected in the arm corresponding to U-phase in the inverter circuit 2, the PWM signal PSu shown in the figure is utilized as the PWM signal for one of the switching elements, and a PWM signal having the inverted level of the PWM signal PSu is utilized as the PWM signal for the other switching element.

Also, if it is supposed that the phase of the phase voltage control signal of V-phase is advanced by 2π/3 from the phase voltage control signal Su of U-phase, a pattern waveform of a PWM signal PSv for the switching elements of the arm corresponding to V-phase is advanced by 2π/3 from that of the PWM signal PSu. If it is supposed that the phase voltage control signal for W-phase is advanced in phase by 4π/3 from the phase voltage control signal Su for U-phase, a pattern waveform of a PWM signal PSw for the switching elements of the arm corresponding to W-phase is advanced by 4π/3 from that of the PWM signal PSu.

FIG. 23 illustrates the principle of generation of the PWM signal based on what is known as a triangle wave comparison method. Specifically, the level range Dc (peak-to-peak value of the amplitude) of the carrier signal Sc is set larger than the level range Du (peak-to-peak value of the amplitude) of the phase voltage control signal Su, and the level of the carrier signal Sc and that of the phase voltage control signal Su are compared, thereby generating the PWM signal PSu having a duty ratio of the pulse signal variably determined in accordance with the positive and negative amplitude values of the phase voltage control signal Su.

As is known, in the PWM signal for the bridge type inverter circuit, a dead time has to be provided so as to prevent the pair of switching elements of each arm from being simultaneously turned on (and to prevent a short-circuit of the arm), and hence the level range Dc of the carrier signal Sc has to be given a certain margin. Accordingly, the level range Dc of the carrier signal Sc has to be provided with an variation region, and the phase voltage control signal Su has to be fluctuated within the variation region.

As shown in FIG. 24, if a third-order harmonic is superimposed on the phase voltage control signal, the peak-to-peak value Pu0 of the phase voltage control signal becomes smaller than a peak-to-peak value (Pu) without the third-order harmonic superposed (in FIG. 24, a waveform Vu represents the phase voltage control signal on which the third-order harmonic is not superposed, and a waveform Vu0 represents the phase voltage control signal with the third-order harmonic superposed thereon). In the case where the phase voltage signals of U-phase, V-phase and W-phase are balanced, even though third-order harmonic is included in each phase voltage signal, the third-order harmonic is not included in the line voltage signal between the U-V, V-W, and W-U lines (See waveform Xuv in FIG. 24), and hence is not outputted to the system 5. Thus, the inverter control circuit 6' is configured so as to enhance the voltage utilization efficiency of the carrier signal Sc in the PWM signal generation process based on the triangle wave comparison method, by utilizing the phase voltage control signal with the third-order harmonic superposed thereon, as the target output of the respective phases.

In FIG. 22, the inverter control circuit 6' includes a target value signal generation circuit 61' and a PWM signal generation circuit 62'. The target value signal generation circuit 61' serves to generate the phase voltage control signal of the respective phases with the third-order harmonic superposed thereon as a target output signal (hereinafter, "target value signal"). The PWM signal generation circuit 62' serves to generate the six PWM signals based on the triangle wave comparison method, utilizing the target value signals Xu0, Xv0, Xw0 of the respective phases input from the target value signal generation circuit 61'.

Also, a phase voltage control signal generation circuit 611' in the target value signal generation circuit 61' serves to generate the phase voltage control signals of the respective phases. A third-order harmonic superposing circuit 612' serves to superpose the third-order harmonic on each of the phase voltage control signals Xu, Xv, Xw of the respective phases outputted by the phase voltage control signal generation circuit 611', thereby generating the target value signals Xu0, Xv0, Xw0. It should also be noted that the phase voltage control signal generation circuit 611' utilizes the output voltage (DC) from the DC power source 1 detected by a DC voltage sensor 7, the phase current (AC) running through each phase of the system 5 detected by a current sensor 8, and the line voltage (AC) of the system 5 detected by a line voltage sensor 9, so as to generate the phase voltage control signals Xu, Xv, Xw of the respective phases, in order to match the target output with the actual phase voltage signals of the respective phases of the system 5.

In the utility interactive inverter system, since the DC power is converted into the AC power by the on/off action of the switching elements in the inverter circuit 2, the power consumption for the on/off action of the switching elements causes the power conversion loss (generally called "switching loss"). Accordingly, for the purpose of improving the power conversion efficiency in the inverter circuit 2, it has been proposed to reduce the frequency of the carrier signal in the PWM signal generation circuit 62' and to switching the frequency for reducing the switching loss.

Patent Document 1: JP-A-2007-228745

DISCLOSURE OF THE INVENTION

Problems to be Solved by the Invention:

In the conventional PWM signal generation process based on the triangle wave comparison method, the target value signals Xu0, Xv0, Xw0 fluctuate within the variation region in the level range Dc of the carrier signal Sc as shown in FIG. 23, and hence the PWM signal inevitably includes a pulse in each cycle. In the case, in particular, where the third-order harmonic is superposed on the phase voltage control signal Xu, Xv, Xw, a certain margin has to be provided in the both end portions of the level range Dc of the carrier signal Sc, so as to cause the target value signals Xu0, Xv0, Xw0 to fluctuate in a central region of the level range Dc, in order to inhibit the line voltage signals between the U-V, V-W and W-U lines to be output to the system 5 from including the third-order harmonic. Thus, the PWM signal includes a pulse without fail, in each cycle.

Conventionally, therefore, the switching loss is reduced by expanding the cycle of the PWM signal and reducing the frequency of the carrier signal, for reducing the number of pulses in a predetermined period (number of switching times of the switching element).

However, if the frequency of the carrier signal is reduced in all the periods PWM modulation may not be properly performed in a period where the output current largely fluctuates in the inverter circuit 2, which results in degraded stability of the output current. Besides, if the frequency of the carrier signal is switched in a specific period, the PWM signal frequency fluctuates in response to that switching, which leads to fluctuation of the frequency band of the switching noise to be eliminated. This leads to the disadvantage that the filter circuit 3 has to be designed so as to eliminate the switching noise of the entirety of the fluctuating frequency band.

The present invention has been proposed under the above-described circumstances. It is therefore an object to provide an inverter control circuit that generates a PWM signal for each phase such that a period where a pulse is not generated is cyclically formed, to cyclically stop a switching action of a switching element, thereby reducing switching loss.

Means for Solving the Problems:

To solve the above-described problem, the present invention takes the following technical measures.

A first aspect of the present invention provides an inverter control circuit that controls the operation of a plurality of switching devices in a three-phase inverter circuit by PWM signals. The inverter control circuit generates and outputs PWM signals configured to ensure that the waveform of a phase voltage outputted from the three-phase inverter circuit through a low-pass filter is zero in a first one-third period of a cycle; is a sine wave corresponding to a phase from 0 to $2\pi/3$ in a subsequent one-third period of the cycle; and is a sine wave corresponding to a phase from $\pi/3$ to $\pi$ in a remaining one-third period of the cycle.

In a preferred embodiment of the present invention, the inverter control circuit comprises a target value signal generator that generates first through third target value signals, where the first target value signal has a waveform which is zero in the first one-third period of the cycle, is a sine wave corresponding to a phase from 0 to $2\pi/3$ in the subsequent second one-third period of the cycle, and is a sine wave corresponding to a phase from $\pi/3$ to $\pi$ in the remaining one-third period of the cycle, the second target value signal has a phase advanced by $2\pi/3$ from the first target value signal, and the third target value signal has a phase delayed $2\pi/3$ from the first target value signal. The inverter control circuit also comprises a PWM signal generator that generates the PWM signals based on the target value signals.

In a preferred embodiment of the present invention, a sine wave signal forming the waveform of the first to the third target value signals is a line voltage control signal having the same waveform as that of a balanced three-phase line voltage signal to be outputted from the three-phase inverter circuit.

In a preferred embodiment of the present invention, the target value signal generator includes: a phase voltage control signal generator that generates three phase voltage control signals for controlling the three-phase voltage outputted from the three-phase inverter circuit; a control signal converter that converts the three phase voltage control signals into the line voltage control signal; and a signal generator that generates the first to the third target value signals for the respective phases of the three-phase inverter circuit, based on the line voltage control signal.

In a preferred embodiment of the present invention, the signal generator generates the respective target value signals of the phases, by combining two line voltage control signals and a zero signal so as to select a largest value of these three signals, the two line voltage control signals being obtained by subtracting the phase voltage control signal of a phase one sequence anterior to a given phase and that of a phase one sequence posterior to the given phase, respectively, from the phase voltage control signal of the given phase, the zero signal constantly having a value of zero.

In a preferred embodiment of the present invention, the signal generator generates the respective target value signal of the phases, the target value signal of a given phase being zero for the first one-third period of the cycle; is the line voltage control signal obtained by subtracting the phase voltage control signal of a phase one sequence anterior to the given phase from the phase voltage control signal of the given phase, for the second one-third period of the cycle; and is the line voltage control signal obtained by subtracting the phase voltage control signal of a phase one sequence posterior to the given phase from the phase voltage control signal of the given phase, for the remaining one-third period of the cycle.

In a preferred embodiment of the present invention, the target value signal generator includes: a phase voltage control signal generator that generates three phase voltage control signals for controlling the three-phase output voltage output from the three-phase inverter circuit; and a signal generator that generates the first to the third target value signals for the respective phases of the three-phase inverter circuit, from the three phase voltage control signals. For the period where the first target value signal becomes zero, the signal generator generates: the first target value signal by subtracting the first phase voltage control signal from the first phase voltage control signal of the phase corresponding to the first phase voltage control signal, the second target value signal by subtracting the first phase voltage control signal from the second phase voltage control signal of the phase corresponding to the second target value signal, and the third target value signal by subtracting the first phase voltage control signal from the third phase voltage control signal of the phase corresponding to the third target value signal. For the subsequent one-third period following the zero period, the signal generator generates: the first target value signal by subtracting the third phase voltage control signal from the first phase voltage control signal, the second target value signal by subtracting the third phase voltage control signal from the second phase voltage control signal, and the third target value signal by subtracting the third phase voltage control signal from the third phase voltage control signal. For the remaining one-third period of the cycle, the signal generator generates: the first target value signal by subtracting the second phase voltage control signal from the first phase voltage control signal, the second target value signal by subtracting the second phase voltage control signal from the second phase voltage control signal, and the third target value signal by subtracting the second phase voltage control signal from the third phase voltage control signal.

In a preferred embodiment of the present invention, the PWM signal generator generates the PWM signal by comparing each of the three target value signals with a predetermined carrier signal, with the zero level of the target value signal matched with a lowest level of amplitude of the carrier signal.

In a preferred embodiment of the present invention, the inverter control circuit comprises: a calculator that calculates three pulse width values whose absolute value represents a pulse width and whose polarity represents a polarity of a waveform to be utilized for controlling the voltage between the respective output lines of the phases outputted by the three-phase inverter circuit of each sampling period; a determiner that determines whether the pulse width value of a largest absolute value among the three pulse width values calculated by the calculator is larger than zero; and a PWM signal generator that decides a waveform of each phase of the sampling period, according to a first predetermined rule in the case where the pulse width value of the largest absolute value is larger than zero, and according to a rule different from the first predetermined rule in the case where the pulse width value of the largest absolute value is smaller than zero, to generate the PWM signal.

In a preferred embodiment of the present invention, the PWM signal generator forms, in the case where the pulse width value of the largest absolute value is larger than zero: for a first phase where the pulse width value has the largest absolute value, a pulse waveform that includes in its central portion an on-state corresponding to the period of the pulse width value of the first phase, for a second phase following the first phase, a waveform that remains off of through an entire period, and for a third phase following the second phase, a pulse waveform that includes in its central portion an on-state corresponding to the period of the absolute value of the pulse width value of the second phase; and in the case where the pulse width value of the largest absolute value is smaller than zero: for the first phase a waveform that remains off through the entire period, for the second phase a pulse waveform that includes in its central portion the on-state corresponding to the period of the absolute value of the pulse width value of the first phase, and for the third phase a pulse waveform that includes in its central portion the on-state corresponding to the period of the pulse width value of the third phase.

A second aspect of the present invention provides a utility interactive inverter system, comprising the inverter control circuit according to the first aspect of the present invention.

Advantages of the Invention:

According to the present invention, the PWM signal input to the three-phase inverter circuit is maintained at the low level through a one-third period of a cycle. Accordingly, the switching device in the three-phase inverter circuit is kept from performing a switching action during such period. Such arrangement allows reducing the number of times of the switching action, thereby improving the power conversion efficiency of the three-phase inverter circuit.

Other features and advantages of the present invention will become more apparent through the detailed description given hereunder referring to the accompanying drawings.

BRIEF DESCRIPTION OF THE DRAWINGS

FIG. 9 is a diagram describing a method of generating a PWM signal from a target value signal and a carrier signal;

BEST MODE FOR CARRYING OUT THE INVENTION

Figure 1:
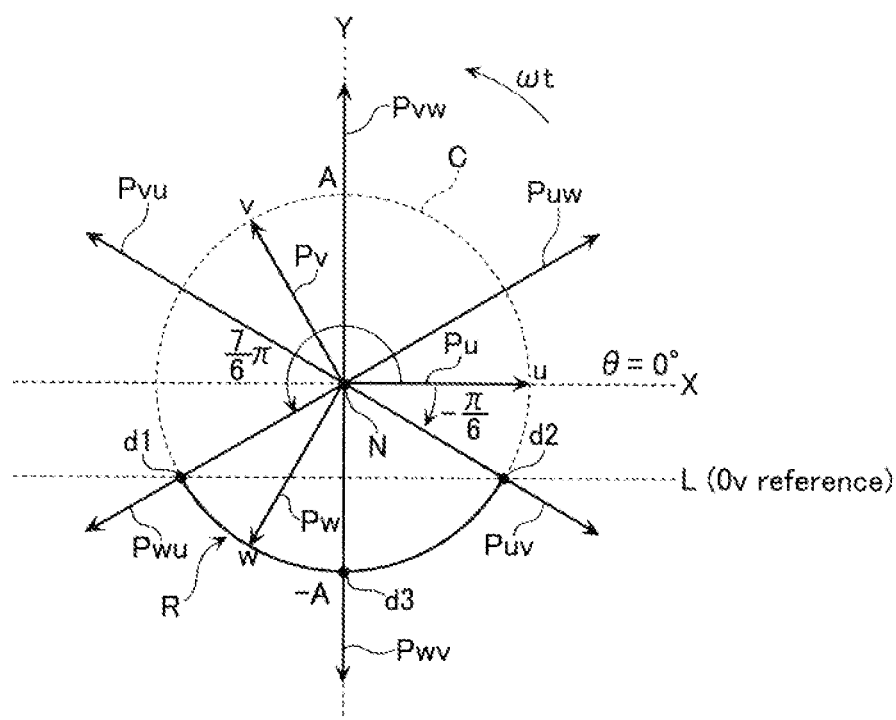
FIG. 1 is a vector diagram showing a relation between phase voltage signals Vu, Vv, Vw and line voltage signals Vwu, Vuv, Vvw.

Preferred embodiments of the present invention will be described below referring to the drawings.

Firstly, a basic idea for reducing switching loss of a three-phase inverter circuit according to the present invention will be described.

Figure 22:
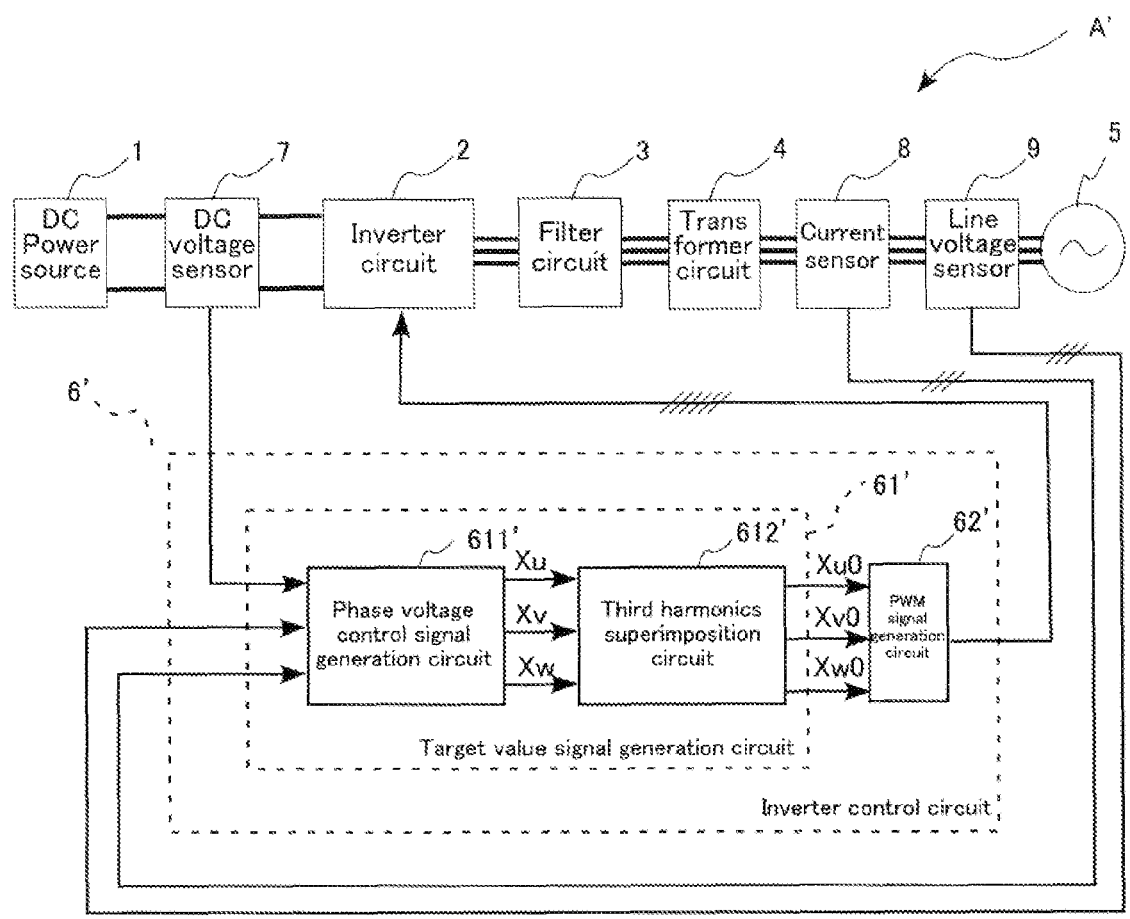
FIG. 22 is a block diagram illustrating an example of a utility interactive three-phase inverter system including a conventional inverter control circuit.
Figure 23:
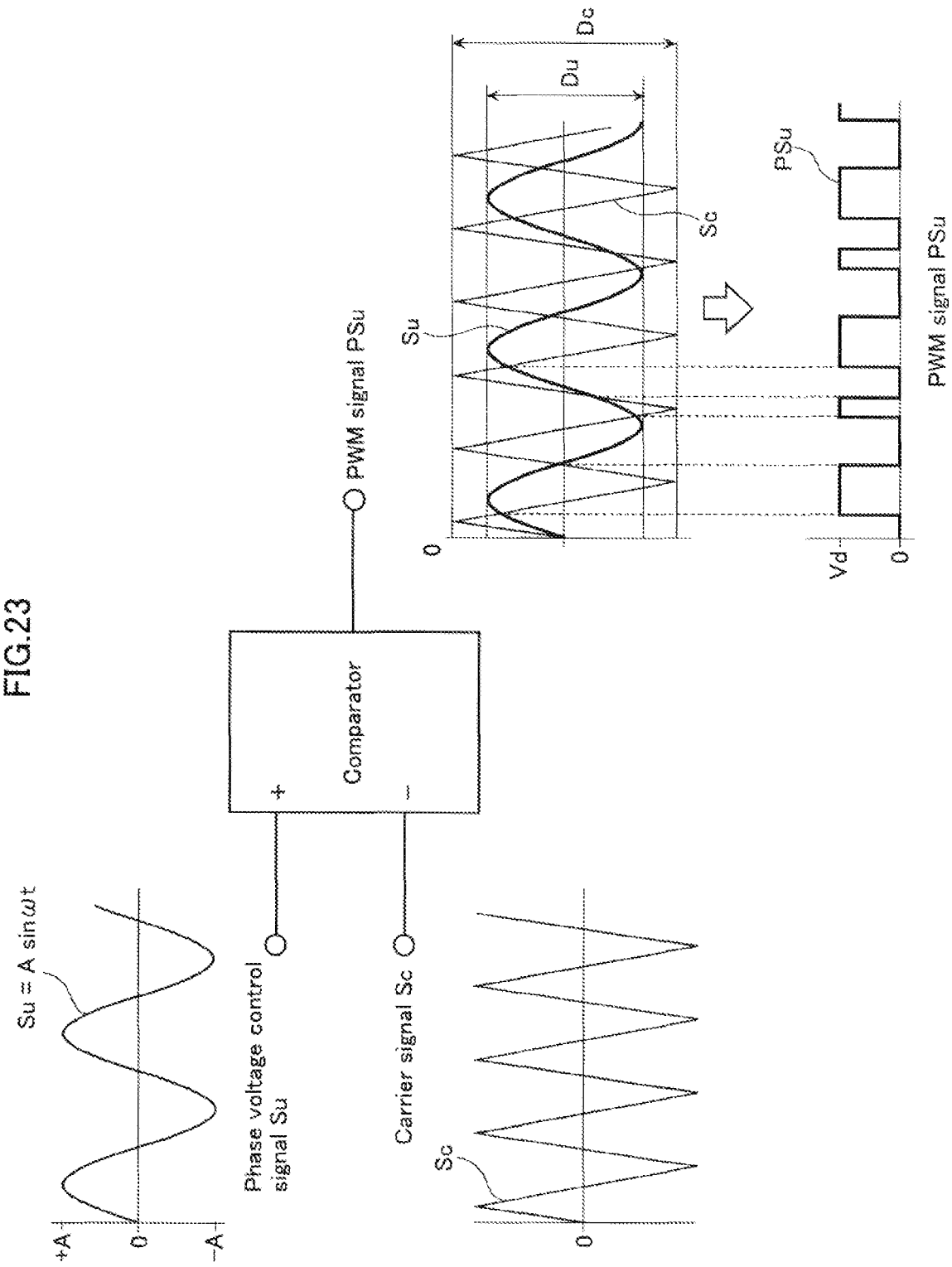
FIG. 23 includes diagrams showing a generation principle of the PWM signal based on a triangle wave comparison method.

In the conventional inverter system A' shown in FIG. 22, the target value signals Xu0, Xv0, Xw0 are set such that the line voltage signals between U-V phases, between V-W phases, and between W-U phases to be outputted to the system 5 are balanced. Specifically, if it is supposed that the phase voltage signals Vu, Vv, Vw to be outputted to U-phase, V-phase and W-phase of the system 5, respectively, is expressed as $Vu=A\cdot\sin(\omega t)$, $Vv=A\cdot\sin(\omega t+2\pi/3)$, and $Vw=A\cdot\sin(\omega t+4\pi/3)$, the signal having the same waveform as the phase voltage signal obtained by superposing the third-order harmonic on the phase voltage signals Vu, Vv, Vw is set as the target value signals Xu0, Xv0, Xw0. Then the target value signals Xu0, Xv0, Xw0 are compared with the carrier signal of the triangle wave to generate the PWM signal.

In this way, the PWM signal generation circuit 62' of the inverter system A' compares the levels of the target value signals Xu0, Xv0, Xw0 and the triangle wave carrier signal with the center of the level range Du of the former and the center of the level range Dc of the latter being matched with each other, and hence a pulse is necessarily generated in each cycle of the PWM signal. Even if the levels of those signals are compared with a lowest value of the level range Du of the target value signal Xu0, Xv0, Xw0 and a lowest value of the level range Dc of the triangle wave carrier signal being matched with each other, the PWM signal cannot include a cycle where a pulse is not generated, since the target value signals Xu0, Xv0, Xw0 are sine wave signals.

In the present invention, the target value signal of each phase does not symmetrically fluctuates in a positive and negative direction from the reference of 0[v] like a sine wave signal. The target value signal varies such that:

(1) the line voltage signals between the U-V, between V-W and between W-U outputted to the system 5 are balanced, and (2) the target value signal is an asymmetrical cyclic signal fluctuating only in a positive direction from the reference of 0[v], and the cycle includes a period of 0[v].

The PWM signal for each phase is generated by comparing the level of the target value signal and that of the triangle wave carrier signal with a lowest value (0[v]) of the level range of the former and a lowest value of the level range of the latter being matched.

With the above-described method, since the PWM signal does not include a pulse in the period of 0[V] of the target value signals Xu0, Xv0, Xw0, the on/off action of the switching elements in the three-phase inverter circuit can be stopped in that period. Thus, the switching elements in the three-phase inverter circuit periodically stop the on/off action, and therefore the switching loss can be proportionally reduced.

Next, the signal that satisfies the conditions (1) and (2) above is described below.

When the phase voltage signals Vu, Vv, Vw are defined as $Vu=A\cdot\sin(\omega t)$, $Vv=A\cdot\sin(\omega t+2\pi/3)$, and $Vw=A\cdot\sin(\omega t+4\pi/3)$ respectively, the line voltage signals Vuv, Vvw, Vwu are expressed as $Vuv=Vu-Vv=\sqrt{(3)}\cdot A\cdot\sin(\omega t-\pi/6)$, $Vvw=Vv-Vw=\sqrt{(3)}\cdot A\cdot\sin(\omega t+3\pi/6)$, and $Vwu=Vw-Vu=\sqrt{(3)}\cdot A\cdot\sin(\omega t+7\pi/6)$. FIG. 1 is the vector diagram showing the relation between the phase voltage signals Vu, Vv, Vw and the line voltage signals Vuv, Vvw, Vwu.

FIG. 1 shows the state where a vector Pu corresponding to the U-phase voltage signal Vu falls on the X-axis, with the X-axis being set as the phase reference ($\theta=0°$). The vectors Pu, Pv, Pw correspond to the phase voltage signals Vu, Vv, Vw, respectively, and vectors Puv, Pvw, Pwu correspond to the phase voltage signals Vuv, Vvw, Vwu, respectively. Also, vectors Pvu, Pwv, Puw are inversions of the vectors Puv, Pvw, Pwu, respectively. Accordingly, the line voltage signals Vvu, Vwv, Vuw corresponding to the vectors Pvu, Pwv, Puw are of the phase shifted by n from that of the line voltage signals Vuv, Vvw, Vwu, respectively, and are expressed as $Vvu=-Vuv=\sqrt{(3)}\cdot A\cdot\sin(\omega t+5\pi/6)$, $Vwv=-Vvw=\sqrt{(3)}\cdot A\cdot\sin(\omega t+9\pi/6)$, and $Vuw=-Vwu=\sqrt{(3)}\cdot A\cdot\sin(\omega t+\pi/6)$, respectively.

The above-described condition (1) corresponds to the state where the vectors Pu, Pv, Pw are rotating counterclockwise about a neutral point N at an angular speed $\omega$ in FIG. 1, maintaining a phase difference of $2\pi/3$ from each other. Generally, the neutral point N is set on the reference voltage of 0[v], and hence the phase voltage signals Vu, Vv, Vw of U-phase, V-phase and W-phase appear as an orthogonal projection of the vectors Pu, Pv, Pw on the Y-axis, in a form of the sine wave signal shifted in phase by $2\pi/3$ from each other, as stated above.

Referring to the condition (2), a lowermost point d3 of the circle C drawn by the rotating tips of the vectors Pu, Pv, Pw (position of −A on the Y-axis) may be set on the reference voltage of 0[v], in order to cause the phase voltage signals Vu, Vv, Vw to fluctuate only in a positive direction from the reference of 0[v]. By such method, however, since the phase voltage signals Vu, Vv, Vw become 0[v] only at the instant that the points of the vectors Pu, Pv, Pw pass the point d3, merely shifting the position of the 0[v] reference is not sufficient to cyclically maintain the phase voltage signals Vu, Vv, Vw at 0[V] during a certain period.

Accordingly, in order to cyclically maintain the phase voltage signals Vu, Vv, Vw at 0[V] during a certain period, it is necessary to allocate a partial region on the circle C as a 0[v] reference region R, so that the phase voltage signals Vu, Vv, Vw are retained at 0[v] during the period that the points of the vectors Pu, Pv, Pw pass through the reference region R.

Also, to satisfy the condition that the phase voltage signals Vu, Vv, Vw should fluctuate only in a positive direction, the 0[v] reference region R has to be set such that while one of the vectors Pu, Pv, Pw is passing through the reference region R, the remaining two vectors pass through an upper region along the Y-direction in FIG. 1. Also, another vector has to enter the reference region R at the moment that the vector passing through the reference region R goes out thereof, so that any of the three vectors Pu, Pv, Pw constantly has to be moving in the reference region R.

For such purpose, 0[v] reference line L parallel to the X-axis and horizontally intersecting the circle C may be provided, and in order to satisfy the foregoing conditions such reference line L may be located so as to pass a point d1 and a point d2 as shown in FIG. 1. The points d1, d2 correspond to the position where the points of the vector Pv and the vector Pw fall on respectively, upon rotating the circle C counterclockwise by $\pi/2$ in FIG. 1. In terms of the rotational position of the vector Pu, the point d1 corresponds to the position rotated by $\theta=7\pi/6$, and the point d2 to the position rotated by $\theta=11\pi/6$. According to the present invention, therefore, the 0[v] reference region R is located in the region between the points d1 and d2 along the circle C.

The foregoing condition (1) can be expressed as that, for example when the vector Pu rotates about the neutral point N as shown in FIG. 1, the vector Pv moves maintaining constantly an apex angle of $+2\pi/3$ with respect to the vector Pu, and the vector Pw moves maintaining constantly an apex angle of $-2\pi/3$ with respect to the vector Pu, in other words that the vectors Pu, Pv, Pw move such that the points thereof constantly form an equilateral triangle T.

Since the rotation of the vector Pu about the neutral point N is relative, the foregoing condition (1) is satisfied as long as the positional relationship of the vectors Pv, Pw with respect to the vector Pu is maintained such that the points of the vectors Pu, Pv, Pw form the equilateral triangle T, in the case where the neutral point N is rotated about the point of the vector Pu. The conventional rotation of the vectors Pu, Pv, Pw can be understood as the rotation of the points of the vectors Pu, Pv, Pw produced by the rotation of the equilateral triangle T about the center of gravity (neutral point N) at a speed of $\omega t$. The rotation of the vectors Pu, Pv, Pw according to the present invention can be understood, as shown in FIG. 2, as the rotation of the points of the vectors Pu, Pv, Pw produced by the rotation of the equilateral triangle T on the reference line L at a speed of $\omega t$.

Figure 2:
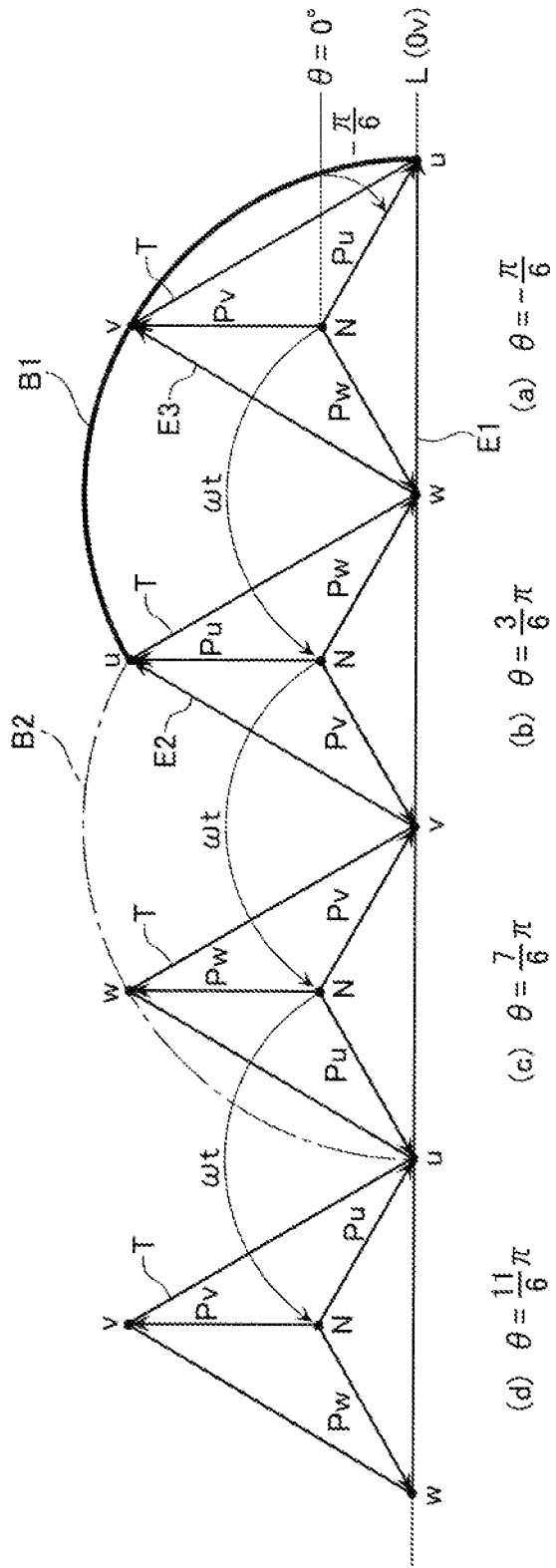
FIG. 2 is a diagram showing how a position of a reference voltage is shifted, by rotating on a reference line an equilateral triangle formed by the vectors Pu, Pv, Pw respectively corresponding to the phase voltage signal Vu, Vv, Vw.

FIG. 2 illustrates the rotational position of the vectors Pu, Pv, Pw determined by one rotation of the equilateral triangle T from the position of $\theta=-\pi/6$, and positions (a) to (d) correspond to the rotational position of $\theta=-\pi/6$, $\theta=3\pi/6$, $\theta=7\pi/6$, and $\theta=11\pi/6$, respectively. Here, the position of $\theta=0$ is, as shown in FIG. 1, where the vector Pu falls on the X-axis.

As shown in the figure, the equilateral triangle T rotates about the point w of the vector Pw in the sector from (a) to (b); the equilateral triangle T rotates about the point v of the vector Pv in the sector from (b) to (c); the equilateral triangle T rotates about the point u of the vector Pu in the sector from (c) to (d). In FIG. 2, although the equilateral triangle T does not rotate so smoothly as rolling the circle C, the equilateral triangle T is constantly maintained and besides the three vectors Pu, Pv, Pw constantly move in the region not lower than the reference voltage of 0[v], and therefore the conditions (1), (2) are satisfied. Accordingly, generating the target value signal having the waveform of the phase voltage signals obtained from the rotation of the vectors Pu, Pv, Pw as shown in FIG. 2 (hereinafter, "phase voltage signals Vu1, Vv1, Vw1") still enables outputting the balanced line voltage signals Vuv, Vvw, Vwu to the system 5.

Figures 3, 4:
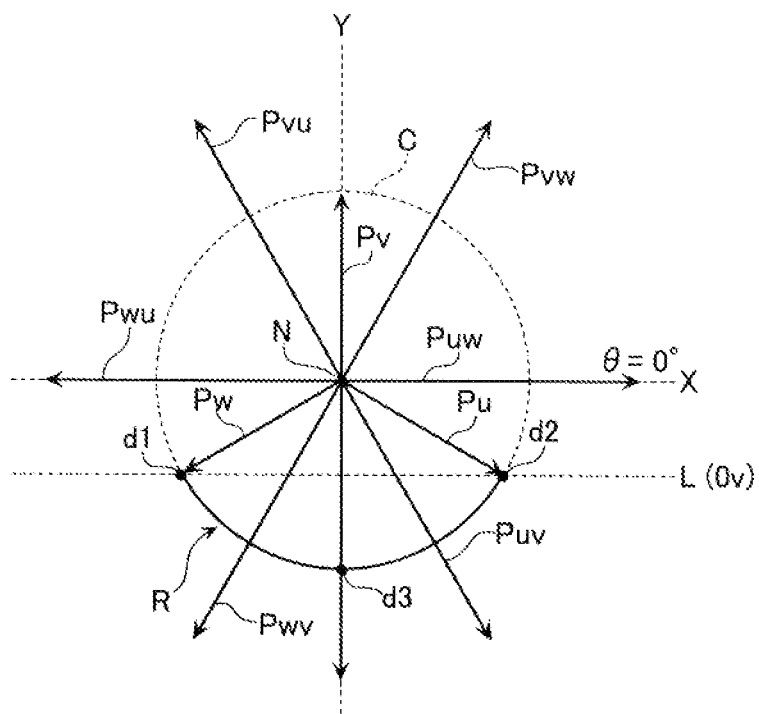
FIG. 3 is a vector diagram provided by rotating the vector diagram of FIG. 1 clockwise by $\pi/6$.
FIG. 4 is a table showing a relation between the phase voltage signals for U-phase, V-phase and W-phase according to the present invention and the line voltage signals.

Referring now to FIGS. 1 to 3, the waveforms of the phase voltage signals Vu1, Vv1, Vw1 of U-phase, V-phase and W-phase will be described.

The waveforms of the phase voltage signals of U-phase, V-phase and W-phase are determined by the position of the tips of the vectors Pu, Pv, Pw, respectively. In FIG. 1, since the neutral point N is fixed on the reference voltage 0[v] and the tips of the vectors Pu, Pv, Pw rotate about the neutral point N, the waveforms of the phase voltage signals Vu, Vv, Vw of U-phase, V-phase and W-phase are calculated from $A \cdot \sin(\theta)$, where A and $\theta$ are the magnitude and the phase, respectively, of the vectors Pu, Pv, Pw.

In the case of FIG. 2, the reference voltage 0[v] is set on the reference line L, and when an apex of the equilateral triangle T (point of the vectors Pu, Pv, Pw) falls on the reference line L, the equilateral triangle T rotates about that apex, and hence the position of the reference voltage 0[v] is shifted each time the equilateral triangle T rotates by $2\pi/3$. Accordingly, to obtain the trajectory of the tips of the vectors Pu, Pv, Pw, the position of the reference voltage 0[v] has to be shifted each time the equilateral triangle T rotates by $2\pi/3$, so as to obtain the trajectory with respect to the position of the reference voltage 0[v] that has been shifted.

For example, whereas the waveform of the U-phase voltage signal Vu1 is determined by the position of the tip of the vector Pu with respect to the reference voltage 0[v], since the tip of the vector Pw is set on the reference voltage 0[v] in the period from (a) to (b) ($\theta$ is $-\pi/6$ to $3\pi/6$) in FIG. 2, the waveform of the U-phase voltage signal Vu1 is the waveform of the tip of the vector E1 extending from the point w to the point u, drawn by the rotation thereof from the orientation at (a) to the orientation at (b) (bold line B1 in FIG. 2). Likewise, in the period from (b) to (c) ($\theta$ is $3\pi/6$ to $7\pi/6$), since the tip of the vector Pv is set on the reference voltage 0[v], the waveform of the U-phase voltage signal Vu1 is the waveform of the tip of the vector E2 extending from the point v to the point u, drawn by the rotation thereof from the orientation at (b) to the orientation at (c) (dash-dot line B2 in FIG. 2). Further, in the period from (c) to (d) ($\theta$ is $7\pi/6$ to $11\pi/6$), since the tip of the vector Pu is set on the reference voltage 0[v], the waveform of the U-phase voltage signal Vu1 is fixed on the reference voltage 0[v].

FIG. 3 is a vector diagram in which the vector diagram of FIG. 1 is rotated by −π/6 to establish the state of FIG. 2(a). Whereas the waveform represented by the bold line B1 in FIG. 2 is drawn by the rotation of the vector E1 about the tip of the vector Pw from 0 to 2π/3, this waveform is identical to the waveform drawn by the rotation of the vector Puw of the same phase as the vector E1 (θ=0) in FIG. 3, from 0 to 2π/3. In other words, the waveform coincides with that of the line voltage signal Vuw in the period from −π/6 to 3π/6. Likewise, whereas the waveform represented by the dash-dot line B2 in FIG. 2 is drawn by the rotation of the vector E2 about the point of the vector Pv from π/3 to π, this waveform is identical to the waveform drawn by the rotation of the vector of the same phase as the vector E2 (θ=π/3) (i.e. vector Puv of θ=−π/3 in FIG. 3) from π/3 to π, in the vector diagram of FIG. 3 rotated counterclockwise by 2π/3. In other words, the waveform coincides with that of the line voltage signal Vuv in the period from 3π/6 to 7π/6.

Thus, the waveform of the U-phase voltage signal Vu1 through an entire cycle is obtained as a composite wave of the line voltage signal Vuw (−π/6 to 3π/6), line voltage signal Vuv (3π/6 to 7π/6), and 0[v] (7π/6 to 11π/6).

The waveform of the V-phase and W-phase voltage signals Vv1, Vw1 through an entire cycle can also be obtained through similar procedures. Although the details thereof will be omitted, the waveform of the V-phase voltage signals Vv1 through a cycle can be obtained as a composite wave of the line voltage signal Vvw in the period from −π/6 to 3π/6, 0[v] in the period from 3π/6 to 7π/6, and the line voltage signal Vvu in the period 7π/6 to 11π/6. Likewise, the waveform of the W-phase voltage signals Vw1 through a cycle can be obtained as a composite wave of 0[v] in the period from −π/6 to 3π/6, the line voltage signal Vwv in the period from 3π/6 to 7π/6, and the line voltage signal Vwu in the period 7π/6 to 11π/6.

Figure 5:
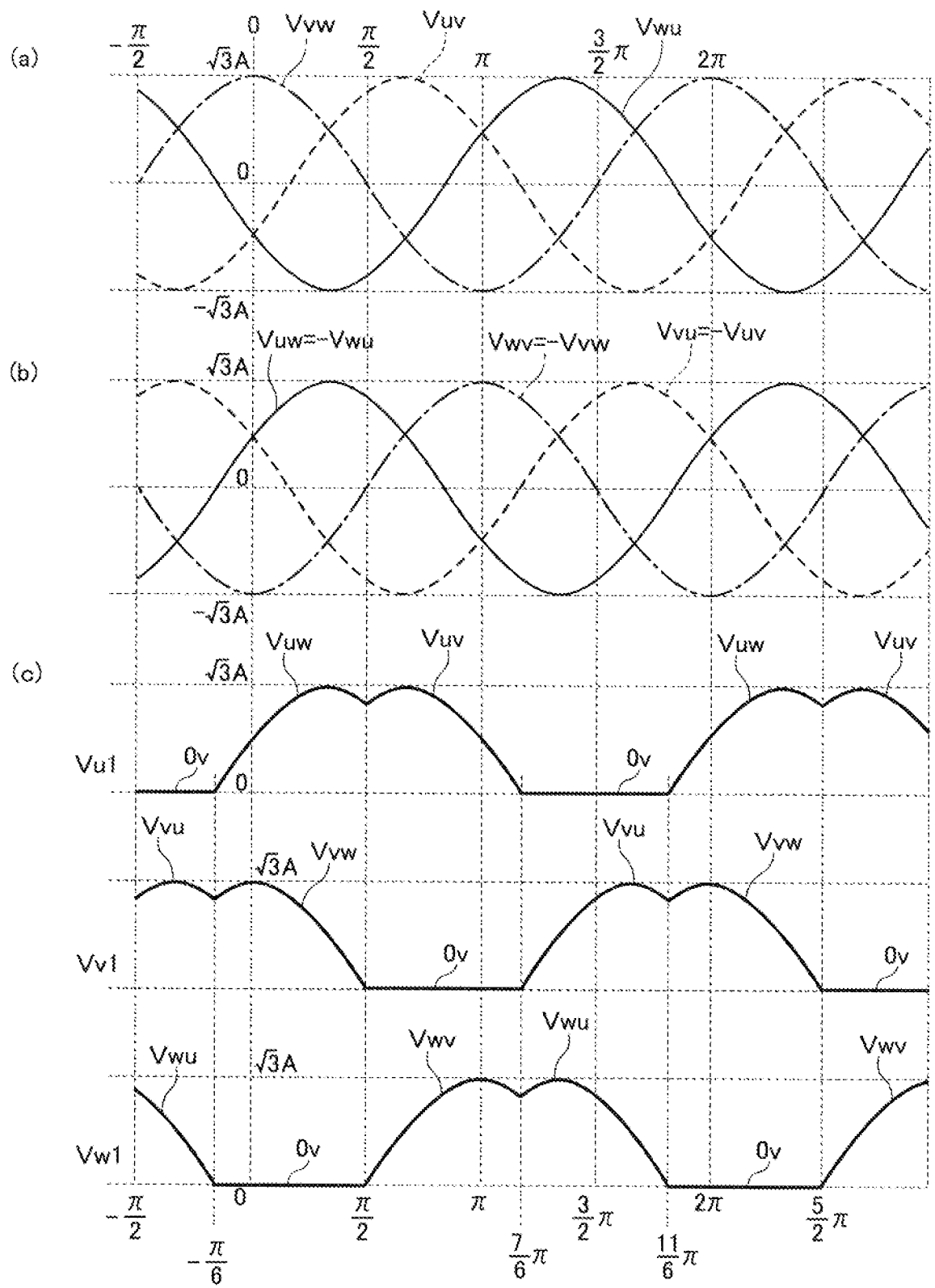
FIG. 5 is a diagram showing waveforms of the line voltage signals Vwu, Vuv, Vvw, Vuw, Vvu, Vwv and the phase voltage signals Vu1, Vv1, Vw1 for U-phase, V-phase and W-phase according to the present invention.

In summary of the foregoing, the waveforms of the phase voltage signals Vu1, Vv1, Vw1 of U-phase, V-phase and W-phase, respectively, are expressed as shown in the table of FIG. 4, and the actual waveforms are illustrated in FIG. 5. Here, FIG. 5(a) illustrates the waveforms of the line voltage signals Vuv, Vvw, Vwu; FIG. 5(b) those of the line voltage signals Vvu (=−Vuv), Vwv (=−Vvw), Vuw (=−Vwu); and FIG. 5(c) those of the phase voltage signals Vu1, Vv1, Vw1.

According to FIGS. 4 and 5(a) to 5(c), in the case where the vectors Pu, Pv, Pw corresponding to U-phase, V-phase and W-phase, respectively, are located counterclockwise in the phase sequence of U, V, W as shown in FIG. 1, the line voltage signals to be utilized for forming the waveform of the U-phase voltage signal Vu1 are the line voltage signal Vuw between the U-W lines and the line voltage signal Vuv between the U-V lines. These line voltage signals are obtained by subtracting, from the U-phase voltage signal Vu, the W-phase voltage signal Vw which is one phase anterior to the U-phase and the V-phase voltage signal Vv which is one phase posterior thereto, respectively.

Likewise, the line voltage signals to be utilized for forming the waveform of the V-phase voltage signal Vv1 are the line voltage signal Vvu between the V-U lines and the line voltage signal Vvw between the V-W lines. These line voltage signals can be obtained by subtracting the U-phase voltage signal Vu which is one phase anterior to the V-phase and the W-phase voltage signal Vw which is one phase posterior thereto respectively, from the V-phase voltage signal Vv. Further, the line voltage signals to be utilized for forming the waveform of the W-phase voltage signal Vw1 are the line voltage signal Vwv between the W-V lines and the line voltage signal Vwu between the W-U lines. These line voltage signals can be obtained by subtracting the V-phase voltage signal Vv which is one phase anterior to the W-phase and the U-phase voltage signal Vu which is one phase posterior thereto respectively, from the W-phase voltage signal Vw.

Thus, the line voltage signals to be utilized for forming the waveform of the phase voltage signal of the respective phases are the two line voltage signals obtained by subtracting, from the phase voltage signal of a given phase, the phase voltage signal of the phase one sequence anterior to the given phase and the phase voltage signal of the phase one sequence posterior thereto, respectively.

In the case where the waveforms of the phase voltage signals Vu1, Vv1, Vw1 shown in FIG. 5(c) are utilized as the target value signal, for example, the waveform of the line voltage signal Vuv between the U-V lines to be output to the system 5 can be obtained by adding the waveform of the phase voltage signal Vu1 in FIG. 5(c) to an inverted waveform of the phase voltage signal Vv1, based on Vuv=Vu1−Vv1.

In the period from 3π/6 to 7π/6, since the voltage signal Vv1 is at the 0 level, the waveform of the line voltage signal Vuv is identical to that of the phase voltage signal Vu1, that is, the waveform of the line voltage signal Vuv. Likewise, in the period from 7π/6 to 11π/6, since the voltage signal Vu1 is at the 0 level, the waveform of the line voltage signal Vuv is identical to the inverted waveform of the phase voltage signal Vv1, that is, the inverted waveform of the line voltage signal Vvu (waveform of the line voltage signal Vuv). According to FIG. 1, the line voltage signal Vuv is the orthogonal projection of the vector Puv onto the Y-axis, and hence can be expressed as $\sqrt{3} \cdot A \cdot \sin(\omega t - \pi/6)$. In the period from 3π/6 to 11π/6, therefore, the waveform of the line voltage signal Vuv can be expressed as $\sqrt{3} \cdot A \cdot \sin(\omega t - \pi/6)$.

In the period from −π/6 to 3π/6, the waveform of the line voltage signal Vuv can be obtained from Vuw−Vvw. According to FIG. 1, Vuw=$\sqrt{3} \cdot A \cdot \sin(\omega t + \pi/6)$ and Vvw=$\sqrt{3} \cdot A \cdot \sin(\omega t + 3\pi/6)$ are established, and therefore the waveform of the line voltage signal Vuv can be expressed as Vuw−Vvw=$\sqrt{3} \cdot A \cdot \{\sin(\omega t + \pi/6) - \sin(\omega t + 3\pi/6)\}$. When ωt=θ, the part "sin(ωt+π/6)−sin(ωt+3π/6)" is calculated as follows:

$$\sin\left(\theta + \frac{\pi}{6}\right) - \sin\left(\theta + \frac{3\pi}{6}\right) = \sin(\theta)\cos\left(\frac{\pi}{6}\right) + \cos(\theta)\sin\left(\frac{\pi}{6}\right) - \cos(\theta) \quad (1)$$
$$= \sin(\theta)\cos\left(\frac{\pi}{6}\right) - \cos(\theta)\sin\left(\frac{\pi}{6}\right)$$
$$= \sin\left(\theta - \frac{\pi}{6}\right)$$

Accordingly, in the period from −π/6 to 7π/6 also, the waveform of the line voltage signal Vuv can be expressed as $\sqrt{3} \cdot A \cdot \sin(\omega t - \pi/6)$ like the period from 3π/6 to 11π/6, and the waveform of the line voltage signal Vuv through the entire period from −π/6 to 11π/6 can be obtained by $\sqrt{3} \cdot A \cdot \sin(\omega t - \pi/6)$. The waveform of the line voltage signals Vvw, Vwu can also be similarly obtained, and the vector Pvw and the vector Pwu correspond to the line voltage signals Vvw, Vwu respectively. Accordingly, the line voltage signal Vvw can be expressed as $\sqrt{3} \cdot A \cdot \sin(\omega t + \pi/2)$, and the line voltage signal Vwu as $\sqrt{3} \cdot A \cdot \sin(\omega t + 7\pi/6)$.

As described above, utilizing the waveform of the phase voltage signals Vu1, Vv1, Vw1 shown in FIG. 5(c) as the target value signal also enables outputting the balanced line voltage signals Vuv, Vvw, Vwu to the system 5.

Next, the inverter control circuit that generates the foregoing target value signal and outputs the PWM signal generated based thereon to the inverter 2 will be described.

Figure 6:
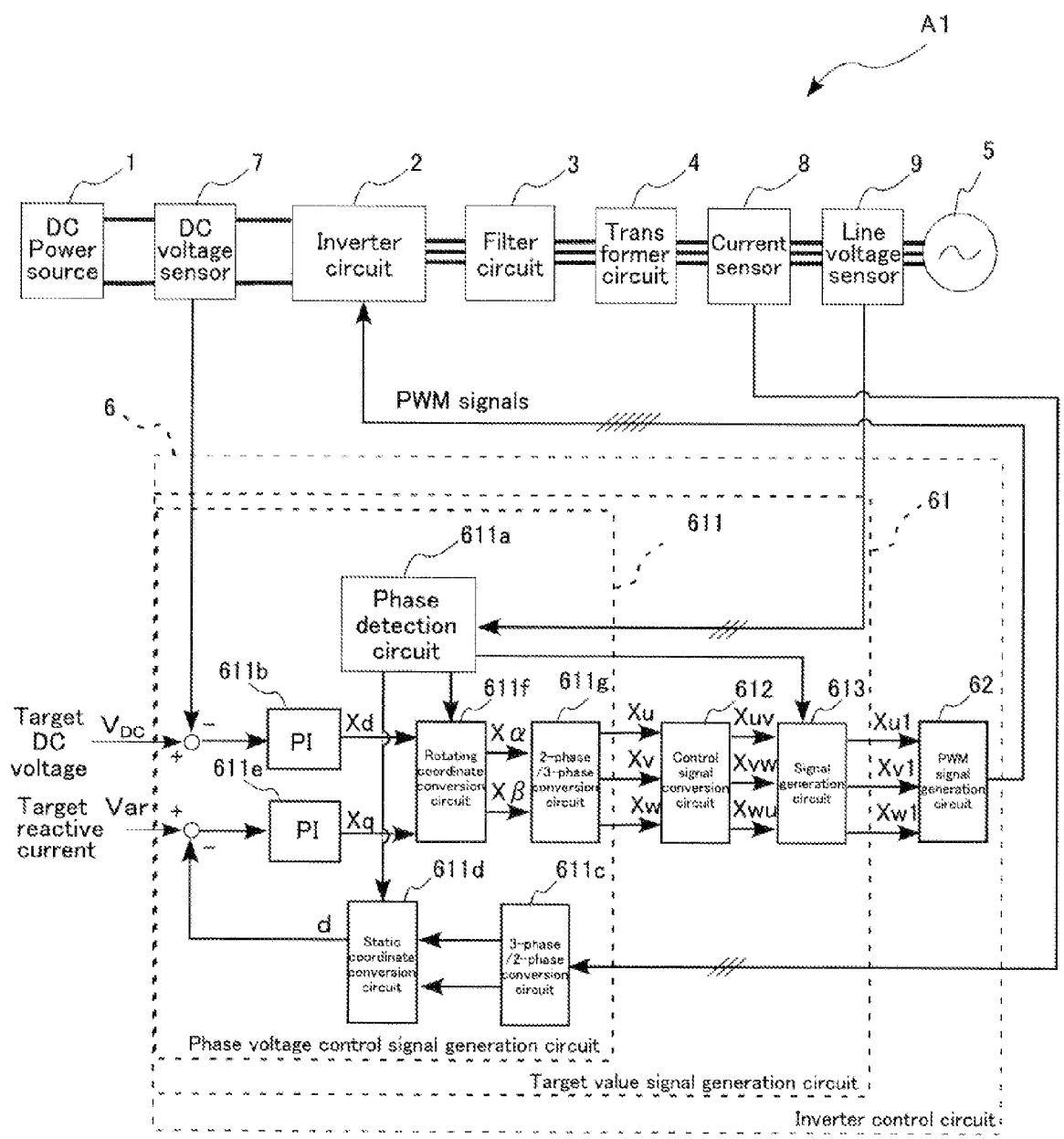
FIG. 6 is a block diagram illustrating an example of a utility interactive inverter system including an inverter control circuit according to a first embodiment of the present invention.

FIG. 6 is a block diagram illustrating an example of a utility interactive inverter system including an inverter control circuit according to a first embodiment of the present invention.

The utility interactive inverter system A1 includes a DC power source 1, an inverter circuit 2, a filter circuit 3, a transformer circuit 4, a commercial power system 5, an inverter control circuit 6, a DC voltage sensor 7, a current sensor 8, and a line voltage sensor 9. The DC power source 1 is connected to the inverter circuit 2. The inverter circuit 2 is a three-phase inverter, and the inverter circuit 2, the filter circuit 3, the transformer circuit 4, and the commercial power system 5 are serially connected in this order through output lines for U-phase, V-phase, and W-phase output voltages. To the inverter circuit 2, the inverter control circuit 6 is connected. The utility interactive inverter system A1 serves to convert DC power generated by the DC power source 1 into AC power with the inverter circuit 2, and to supply the AC power to the commercial power system 5.

The DC power source 1, which generates DC power, is provided with a solar battery for converting solar energy into electric energy.

The inverter circuit 2 is a full-bridge three-phase inverter, and turns on and off the switching elements included therein based on the PWM signal input from the inverter control circuit 6, thereby converting the DC power input from the DC power source 1 into the AC power.

Figure 7:
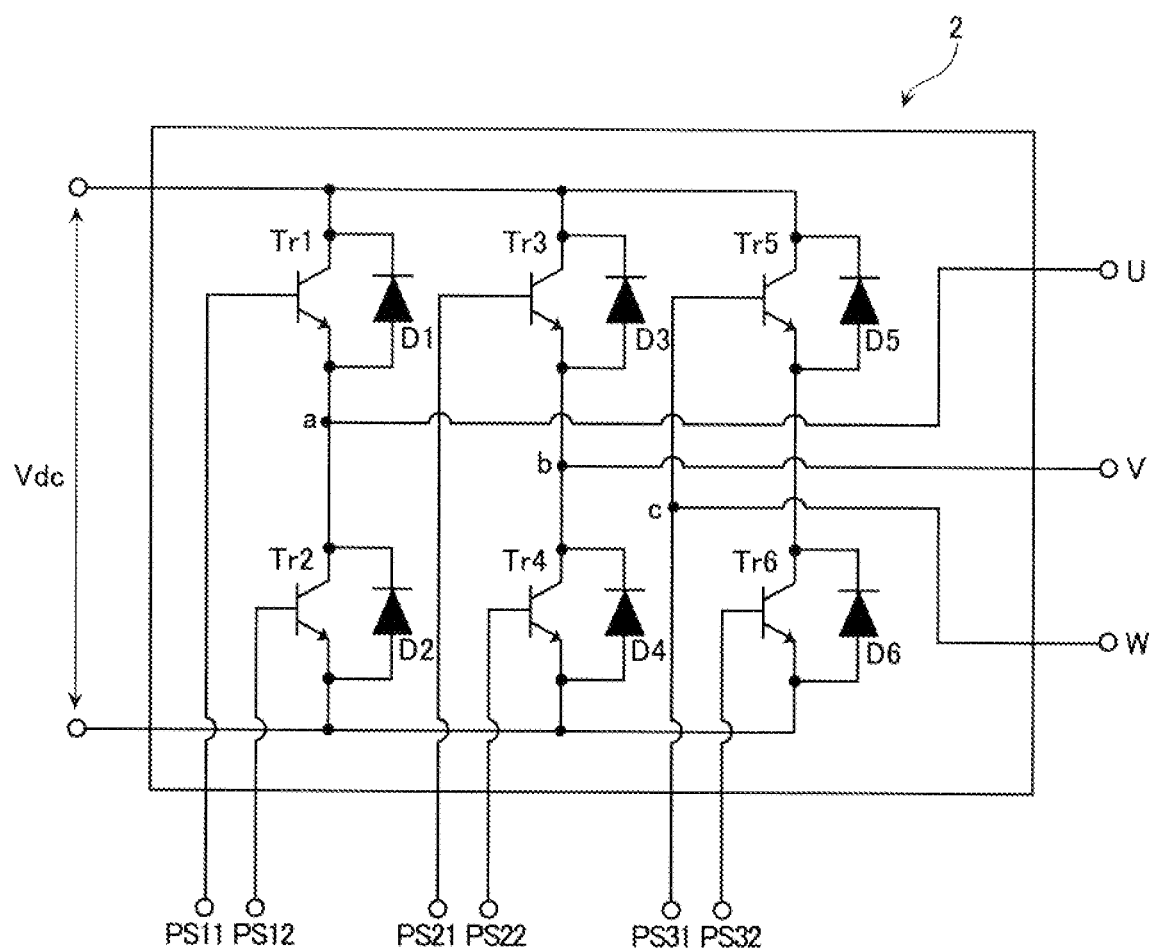
FIG. 7 is a circuit diagram of an example of a full-bridge three-phase inverter circuit.

FIG. 7 is a circuit diagram describing the inverter circuit 2.

The inverter circuit 2 includes six switching elements Tr1 to Tr6 which are bridge-connected. To each of the switching elements Tr1, Tr2, Tr3, Tr4, Tr5, Tr6, feedback diodes D1, D2, D3, D4, D5, D6 are connected in parallel, respectively. As the switching element, a semiconductor switching element such as a bipolar transistor, a field-effect transistor, and a thyristor may be used. FIG. 7 shows the example in which the transistor is employed.

The DC power outputted by the DC power source 1 is feed to the both end portions of the serial connection of the switching element Tr1 and the switching element Tr2 (hereinafter, "first arm"), the serial connection of the switching element Tr3 and the switching element Tr4 (hereinafter, "second arm") and the serial connection of the switching element Tr5 and the switching element Tr6 (hereinafter, "third arm"). The U-phase, V-phase, and W-phase voltage signals are outputted from the connection points a, b, c of the first arm, the second arm and the third arm, respectively.

The six switching elements Tr1 to Tr6 are each turned on and off by the PWM signal output by the inverter control circuit 6. Specifically, the inverter control circuit 6 outputs three sets of PWM signals of different pulse widths, and each set includes two PWM signals of mutually inverted phases. Upon denoting the PWM signals of the respective sets as (PS11, PS12), (PS21, PS22), and (PS31, PS32), the PWM signals PS11, PS12 are respectively input to the control terminal of the switching element Tr1 and the switching element Tr2 (base of the transistor in FIG. 7); the PWM signals PS21, PS22 are respectively input to the control terminal of the switching element Tr3 and the switching element Tr4; and the PWM signals PS31, PS32 are respectively input to the control terminal of the switching element Tr5 and the switching element Tr6.

The filter circuit 3 is a low-pass filter that includes a reactor and a capacitor. The filter circuit 3 serves to remove a switching noise contained in the AC voltage outputted from the inverter circuit 2. The transformer circuit 4 performs a stepping up/down of the AC voltage outputted from the filter circuit 3 to a substantially same level as the voltage of the commercial power system 5 (hereinafter, "system voltage").

The DC voltage sensor 7 serves to detect the DC voltage outputted from the DC power source 1. The detected DC voltage signal is inputted to the inverter control circuit 6. The current sensor 8 serves to detect a current of the respective phases outputted from the transformer circuit 4. The detected current signal is input to the inverter control circuit 6. The line voltage sensor 9 serves to detect a line voltage signal of the respective phases in the commercial power system 5. The detected voltage signal is input to the inverter control circuit 6.

The inverter control circuit 6 serves to generate the PWM signal that controls the on/off action of the switching elements in the inverter circuit 2. To the inverter control circuit 6, the DC voltage signal, the current signal, and the line voltage signal are inputted from the DC voltage sensor 7, the current sensor 8 and the line voltage sensor 9, respectively. The inverter control circuit 6 generates the PWM signal based on these signals, and outputs the PWM signal generated in this way to the inverter circuit 2.

The inverter control circuit 6 includes a target value signal generation circuit 61 and a PWM signal generation circuit 62. The target value signal generation circuit 61 serves to generate the foregoing target value signal and to output the target value signal to the PWM signal generation circuit 62. In the first embodiment, the target value signals generated in the target value signal generation circuit 61 will be denoted by Xu1, Xv1, and Xw1.

The target value signal generation circuit 61 includes a phase voltage control signal generation circuit 611, a control signal conversion circuit 612, and a signal generation circuit 613.

The phase voltage control signal generation circuit 611 receives the input of the DC voltage signal detected by the DC voltage sensor 7, the current signal detected by the current sensor 8, and the line voltage signal detected by the line voltage sensor 9. Further, To the circuit 611, a predetermined target DC voltage and target reactive current are inputted. The phase voltage control signal generation circuit 611 generates the phase voltage control signals Xu, Xv, Xw for controlling the phase voltage of the each of the phases based on those detection signals, the target DC voltage, and the target reactive current, and outputs such signals to the control signal conversion circuit 612.

The phase voltage control signal generation circuit 611 includes a phase detection circuit 611a, a PI control circuit 611b, a three-phase/two-phase conversion circuit 611c, a static coordinate conversion circuit 611d, a PI control circuit 611e, a rotating coordinate conversion circuit 611f, and a two-phase/three-phase conversion circuit 611g.

The phase detection circuit 611a detects the phase of the system voltage based on the line voltage signal input from the line voltage sensor 9, and outputs the phase to the static coordinate conversion circuit 611d, the rotating coordinate conversion circuit 611f, and the signal generation circuit 613. The PI control circuit 611b performs a PI control to execute correction calculation with respect to a difference between the DC voltage signal input from the DC voltage sensor 7 and the target DC voltage, and outputs a correction value signal Xd, representing the calculation result. The three-phase/two-phase conversion circuit 611c converts the three-phase current signal inputted from the current sensor 8 into a two-phase current signal for outputting. The static coordinate conversion circuit 611d receives an input of the two-phase current signal from the three-phase/two-phase conversion circuit 611c, and an input of the phase of the system voltage from the phase detection circuit 611a. The static coordinate conversion circuit 611d converts the two-phase current signal into a phase difference component and an in-phase component with respect to the phase of the system voltage, and outputs such components. The so-called αβ conversion of converting three-phase to two-phase and the so-called dq conversion of converting a rotating coordinate to a static coordinate are well-known, and hence detailed description thereof will be omitted.

The PI control circuit 611e performs the PI control to execute correction calculation with respect to a difference between the reactive current signal, which is the phase difference component output from the static coordinate conversion circuit 611d, and the target reactive current, and outputs a correction value signal Xq, representing the calculation result. The rotating coordinate conversion circuit 611f receives an input of the correction value signal Xd outputted by the PI control circuit 611b as an in-phase component, and an input of the correction value signal Xq outputted by the PI control circuit 611e as a phase difference component, and an input of the phase of the system voltage from the phase detection circuit 611a. The rotating coordinate conversion circuit 611f converts the correction value signal Xd and the correction value signal Xq into two-phase control signals Xα and Xβ for outputting. The two-phase/three-phase conversion circuit 611g converts the control signal Xα, Xβ inputted from the rotating coordinate conversion circuit 611f into the three-phase voltage control signals Xu, Xv, Xw for outputting. The so-called reverse αβ conversion of converting two-phase to three-phase and the so-called reverse dq conversion of converting the static coordinate into the rotating coordinate are well-known, and hence detailed description thereof will be omitted.

Here, the phase voltage control signal generation circuit 611 is not limited to the configuration described above and may be any configurations which generates the phase voltage control signals Xu, Xv, Xw. For example, the phase voltage control signal may be generated so as to control the two-phase current signal without performing the static coordinate conversion, or so as to control the three-phase current signal as it is, without performing the three-phase/two-phase conversion.

The control signal conversion circuit 612 converts the phase voltage control signals Xu, Xv, Xw inputted from the phase voltage control signal generation circuit 611 into the line voltage control signals Xuv, Xvw, Xwu for outputting to the signal generation circuit 613. The control signal conversion circuit 612 generates a signal representing the difference between Xu and Xv as Xuv, a signal representing the difference between Xv and Xw as Xvw, and a signal representing the difference between Xw and Xu as Xwu, thereby converting the control signals.

It is not necessary to generate the phase voltage control signal in order to generate the line voltage control signal. A circuit that directly generates the line voltage control signal may be provided instead of the phase voltage control signal generation circuit 611 and the control signal conversion circuit 612, thereby generating the line voltage control signal.

The signal generation circuit 613 generates and outputs the target value signals Xu1, Xv1, Xw1 from the line voltage control signals Xuv, Xvw, Xwu inputted from the control signal conversion circuit 612 and the signals Xvu, Xwv, Xuw having the polarity reversed from those of the signals Xuv, Xvw, Xwu. Here, the control signal conversion circuit 612 may also generate and output the line voltage control signals Xvu, Xwv, Xuw, so that the signal generation circuit 613 receives the input of the six line voltage control signals Xuv, Xvw, Xwu, Xvu, Xwv, Xuw.

The signal generation circuit 613 calculates Xu1, Xv1, and Xw1 based on the phase of the U-phase voltage signal of the system voltage inputted from the phase detection circuit 611a, according to the following formula (2):

$$\begin{bmatrix} Xu1 \\ Xv1 \\ Xw1 \end{bmatrix} = \begin{bmatrix} \begin{bmatrix} Xuw \\ Xvw \\ 0 \end{bmatrix} & -\frac{1}{6}\pi \leq \theta \leq \frac{3}{6}\pi \\ \begin{bmatrix} Xuv \\ 0 \\ Xwv \end{bmatrix} & \frac{3}{6}\pi \leq \theta \leq \frac{7}{6}\pi \\ \begin{bmatrix} 0 \\ Xvu \\ Xwu \end{bmatrix} & \frac{7}{6}\pi \leq \theta \leq \frac{11}{6}\pi \end{bmatrix} \quad (2)$$

Figure 8:
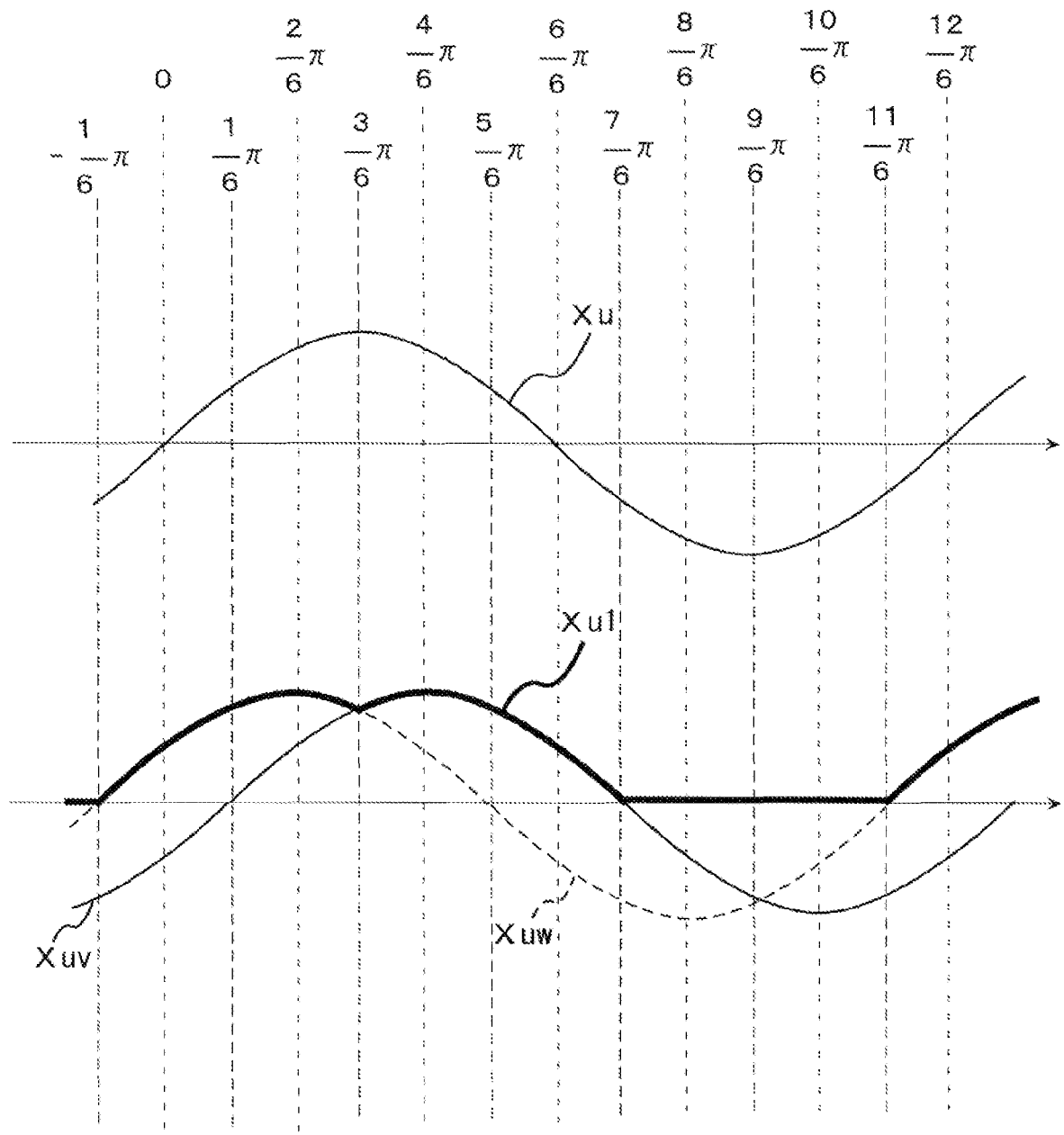
FIG. 8 is a diagram illustrating a waveform of a target value signal Xu1 outputted by a signal generation circuit.

FIG. 8 is a diagram describing the waveform of the target value signal Xu1 outputted by the signal generation circuit 613. The waveform Xu represents the waveform of the phase voltage control signal Xu, and coincides with that of the target U-phase voltage signal of the system voltage. The waveform Xuv represents the waveform of the line voltage control signal Xuv, and the waveform Xuw represents the waveform of the signal Xuw, having the polarity reversed from that of the line voltage control signal Xwu.

As shown in the figure, the target value signal Xu1 appears as the signal Xuw in the period of $-\pi/6 \leq \theta \leq 3\pi/6$; as the line voltage control signal Xuv in the period of $3\pi/6 \leq \theta \leq 7\pi/6$; and becomes zero in the period of $7\pi/6 \leq \theta \leq 11\pi/6$, when the phase of the U-phase voltage signal of the system voltage is denoted as θ. In other words, the waveform Xu1 shown in the figure is identical to the waveform of Vu shown in FIG. 5(c). Likewise, the target value signal Xv1 appears as the signal Xvw in the period of $-\pi/6 \leq \theta \leq 3\pi/6$; becomes zero in the period of $3\pi/6 \leq \theta \leq 7\pi/6$; and appears as the signal Xvu having the polarity reversed from that of the line voltage control signal Xuv in the period of $7\pi/6 \leq \theta \leq 11\pi/6$. Further, the target value signal Xu1 becomes zero in the period of $-\pi/6 \leq \theta \leq 3\pi/6$; appears as the signal Xwv having the polarity reversed from that of the line voltage control signal Xvw in the period of $3\pi/6 \leq \theta \leq 7\pi/6$; and appears as the line voltage control signal Xwu in the period of $7\pi/6 \leq \theta \leq 11\pi/6$.

The two-phase/three-phase conversion circuit 611g calculates the phase voltage control signals Xu, Xv, Xw based on the control signals Xα, Xβ according to the following formula (3). Also, the control signal conversion circuit 612 calculates the line voltage control signals Xuv, Xvw, Xwu based on the phase voltage control signals Xu, Xv, Xw according to formula (4) cited below. From formulas (3) and (4), formula (5) below is obtained.

$$\begin{bmatrix} Xu \\ Xv \\ Xw \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} X\alpha \\ X\beta \end{bmatrix} \quad (3)$$

$$\begin{bmatrix} Xuv \\ Xvw \\ Xwu \end{bmatrix} = \begin{bmatrix} 1 & -1 & 0 \\ 0 & 1 & -1 \\ -1 & 0 & 1 \end{bmatrix} \begin{bmatrix} Xu \\ Xv \\ Xw \end{bmatrix} \quad (4)$$

-continued $$\begin{bmatrix} Xuv \\ Xvw \\ Xwu \end{bmatrix} = \sqrt{\frac{2}{3}} \begin{bmatrix} 1 & -1 & 0 \\ 0 & 1 & -1 \\ -1 & 0 & 1 \end{bmatrix} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} X\alpha \\ X\beta \end{bmatrix} \quad (5)$$

$$= \sqrt{\frac{3}{2}} \begin{bmatrix} 1 & -\frac{1}{\sqrt{3}} \\ 0 & \frac{2}{\sqrt{3}} \\ -1 & -\frac{1}{\sqrt{3}} \end{bmatrix} \begin{bmatrix} X\alpha \\ X\beta \end{bmatrix}$$

From formulas (5) and (2), formula (6) below is obtained. Accordingly, the two-phase/three-phase conversion circuit 611g, the control signal conversion circuit 612, and the signal generation circuit 613 may be unified so as to directly calculate and output the target value signals Xu1, Xv1, Xw1 from the control signals Xα, Xβ, utilizing formula (6).

$$\begin{bmatrix} Xu1 \\ Xv1 \\ Xw1 \end{bmatrix} = \begin{cases} \sqrt{\frac{3}{2}} \begin{bmatrix} 1 & \frac{1}{\sqrt{3}} \\ 0 & \frac{2}{\sqrt{3}} \\ 0 & 0 \end{bmatrix} \begin{bmatrix} X\alpha \\ X\beta \end{bmatrix} & -\frac{1}{6}\pi \le \theta \le \frac{3}{6}\pi \\ \sqrt{\frac{3}{2}} \begin{bmatrix} 1 & -\frac{1}{\sqrt{3}} \\ 0 & 0 \\ 0 & -\frac{2}{\sqrt{3}} \end{bmatrix} \begin{bmatrix} X\alpha \\ X\beta \end{bmatrix} & \frac{3}{6}\pi \le \theta \le \frac{7}{6}\pi \\ \sqrt{\frac{3}{2}} \begin{bmatrix} 0 & 0 \\ -1 & \frac{1}{\sqrt{3}} \\ -1 & -\frac{1}{\sqrt{3}} \end{bmatrix} \begin{bmatrix} X\alpha \\ X\beta \end{bmatrix} & \frac{7}{6}\pi \le \theta \le \frac{11}{6}\pi \end{cases} \quad (6)$$

Referring back to FIG. 6, the PWM signal generation circuit 62 generates the PWM signal of each of the phases from the carrier signal generated therein and the target value signals Xu1, Xv1, Xw1 of the phases inputted from the target value signal generation circuit 61, and outputs the PWM signal to the inverter circuit 2.

FIG. 9(*a*) is a diagram describing a method of generating the PWM signal from the target value signal and the carrier signal. In (a) of the figure, the target value signal is expressed by a waveform F, the carrier signal is expressed by a waveform C, and the PWM signal is expressed by a waveform P. The PWM signal generation circuit 62 generates as the PWM signal such a pulse signal that becomes a high level in a period where the target value signal is larger than the carrier signal and becomes a low level in a period where the target value signal is not larger than the carrier signal. In (a) in the figure, accordingly, the waveform P is at the high level in the period where the waveform F is higher than the waveform C, and at the low level in the period where the waveform F is not higher than the waveform C.

In the first embodiment, the carrier signal is generated so as to fluctuate in the region not lower than the 0 level in the target value signal range, so that a lowest value of the target value signal matches with that of the carrier signal.

The switching elements of U-phase, V-phase, and W-phase in the inverter circuit 2 are turned on and off according to the PWM signal of U-phase, V-phase, and W-phase, respectively. The PWM signal generation circuit 62 also generates the pulse signals inverted from those of U-phase, V-phase, and W-phase, and outputs such pulse signals as the PWM signal of the reversed phase, to the inverter circuit 2. The switching elements connected in series to the switching elements of U-phase, V-phase, and W-phase in the inverter circuit 2 are turned on and off oppositely to the switching elements of U-phase, V-phase, and W-phase, based on the PWM signals of the reversed phase.

An operation of the inverter control circuit 6 will be described below.

In the first embodiment, the target value signal generation circuit 61 outputs the target value signals Xu1, Xv1, Xw1 that form the waveform shown in FIG. 5(*c*), and the PWM signal generation circuit 62 generates the PWM signals based on the target value signals Xu1, Xv1, Xw1, and outputs the PWM signals to the inverter circuit 2. Whereas the phase voltage signals Vu1, Vv1, Vw1 outputted by the inverter circuit 2 show the waveform shown in FIG. 5(*c*), since the line voltage signals representing the differences of the phase voltage signals Vu1, Vv1, Vw1 are generated in the form of the balanced line voltage signals Vuv, Vvw, Vwu shown in FIG. 5(*a*) to be output to the system 5, the voltage can be adjusted to the system voltage. Thus, the AC power output by the inverter circuit 2 can be supplied to the commercial power system 5.

Also, in the first embodiment, the target value signal becomes zero in a one-third period of the cycle. In this period, since the target value signal is not higher than the carrier signal, the PWM signal remains at the low level. Accordingly, the switching element in the inverter circuit 2 to which the PWM signal has been input does not perform the switching action in this period. Such arrangement allows reducing the number of switching times of the switching elements in the inverter circuit 2, thereby suppressing the switching loss and improving the power conversion efficiency of the inverter circuit 2. Also, since the frequency of the carrier signal remains unchanged, the filter circuit 3 can be assumed to be capable of removing the switching noise at that frequency, in the designing process.

In the inverter control circuit 6 according to the first embodiment, the phase voltage control signal generation circuit 611 and the PWM signal generation circuit 62 are the same as those employed in the conventional inverter control circuit 6', and hence the inverter control circuit 6 can be obtained simply by replacing the third-order harmonic superpose circuit 612' in the conventional inverter control circuit 6' with the control signal conversion circuit 612 and the signal generation circuit 613.

Figure 24:
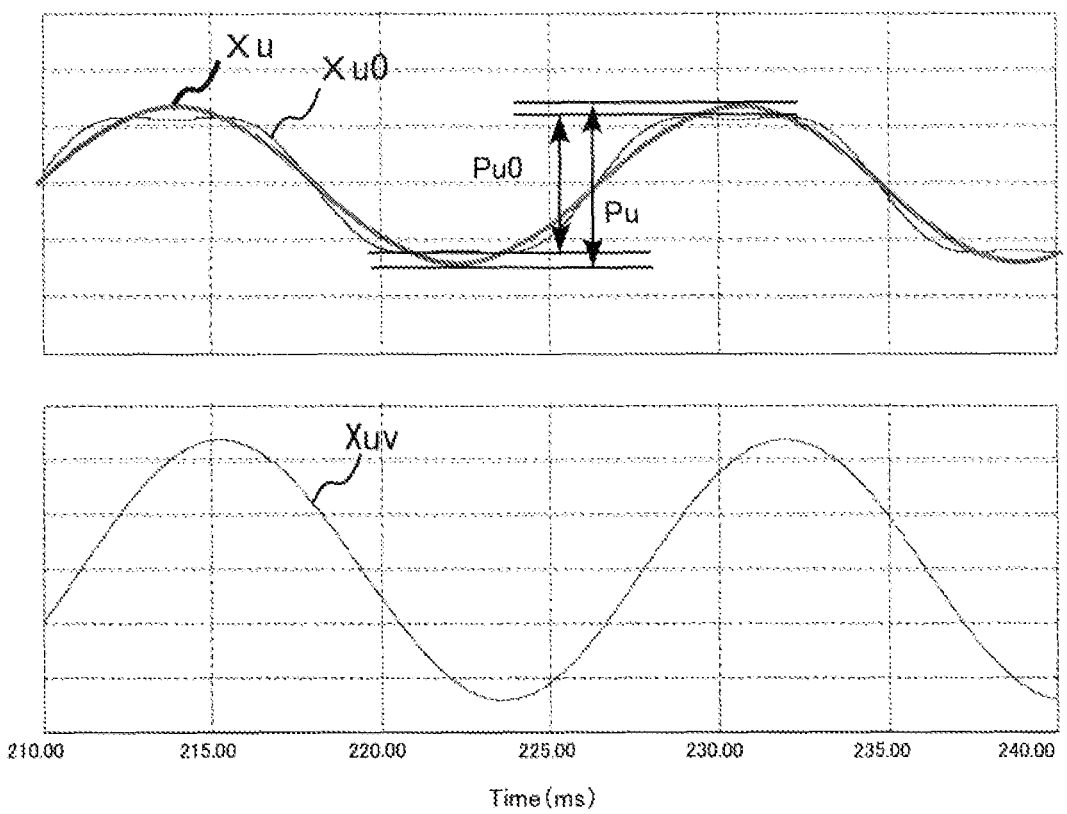
FIG. 24 is a diagram showing a waveform of the phase voltage control signal, and that of a target value signal generated by superposing thereon a third-order harmonic.

FIG. 9(*b*) is illustrated for comparison with FIG. 9(*a*), and shows a waveform F' of the target value signal (phase voltage control signal with the third-order harmonic superposed thereon. See waveform Xu0 in FIG. 24) inputted to the PWM signal generation circuit 62' of the conventional inverter control circuit 6', the waveform C of the carrier signal, and a waveform P' of the PWM signal.

In each of (a) and (b) in the figure, the length of arrow L on the left end corresponds to the amplitude of the carrier signal C, and indicates a maximum settable range of the length of the high-level period of the PWM signal. However, in the case where the high-level period is too long or too short, the accuracy of the length of the high-level period is degraded because of dead time incidental to the generation of the PWM signal. Accordingly, a margin is provided so as to prevent such range where the accuracy is degraded from being utilized. Solid line arrows M1, M2 in (a) and (b) in the figure indicate the range corresponding to such margin. In the first embodiment, as shown in (a) in the figure, the margin for the case where the high-level period becomes too short (region corresponding to the arrow M2) is not provided, so as to inhibit the target value signal from exceeding the carrier signal in the zero period. Such arrangement can still effectively suppress the degradation in accuracy originating from the dead time.

Dotted line arrow N on the right end of each of (a) and (b) in the figure indicates the utilizable range, defined upon excluding the range corresponding to the margin from the length settable range of the high-level period. In other words, it is within this range that the length of the high-level period of the PWM signal can be set. As illustrated in the figure, the range corresponding to the dotted line arrow N in (a) is wider than that in (b), by the amount corresponding to the range indicated by the arrow M2. In the first embodiment, therefore, higher power utilization efficiency is achieved than in the conventional system.

In the case of employing the conventional inverter control circuit 6', since the switching is performed in all of the three phases of the inverter circuit 2, the common potential which is the total of the potential of each of the three phases fluctuates in a voltage range three times as large as the output voltage of the DC power source 1 (hereinafter, "DC voltage"). However, in the first embodiment, since the potential of one of the phases is constantly zero, the common potential fluctuates in a voltage range only twice as large as the DC voltage. In the first embodiment, therefore, noise due to EMI originating in proportion to the common potential can be suppressed compared to the conventional system.

Although the foregoing embodiment refers to the case where a digital processing is executed, the present invention is also applicable to the case where an analog signal processing is executed.

Figure 10:
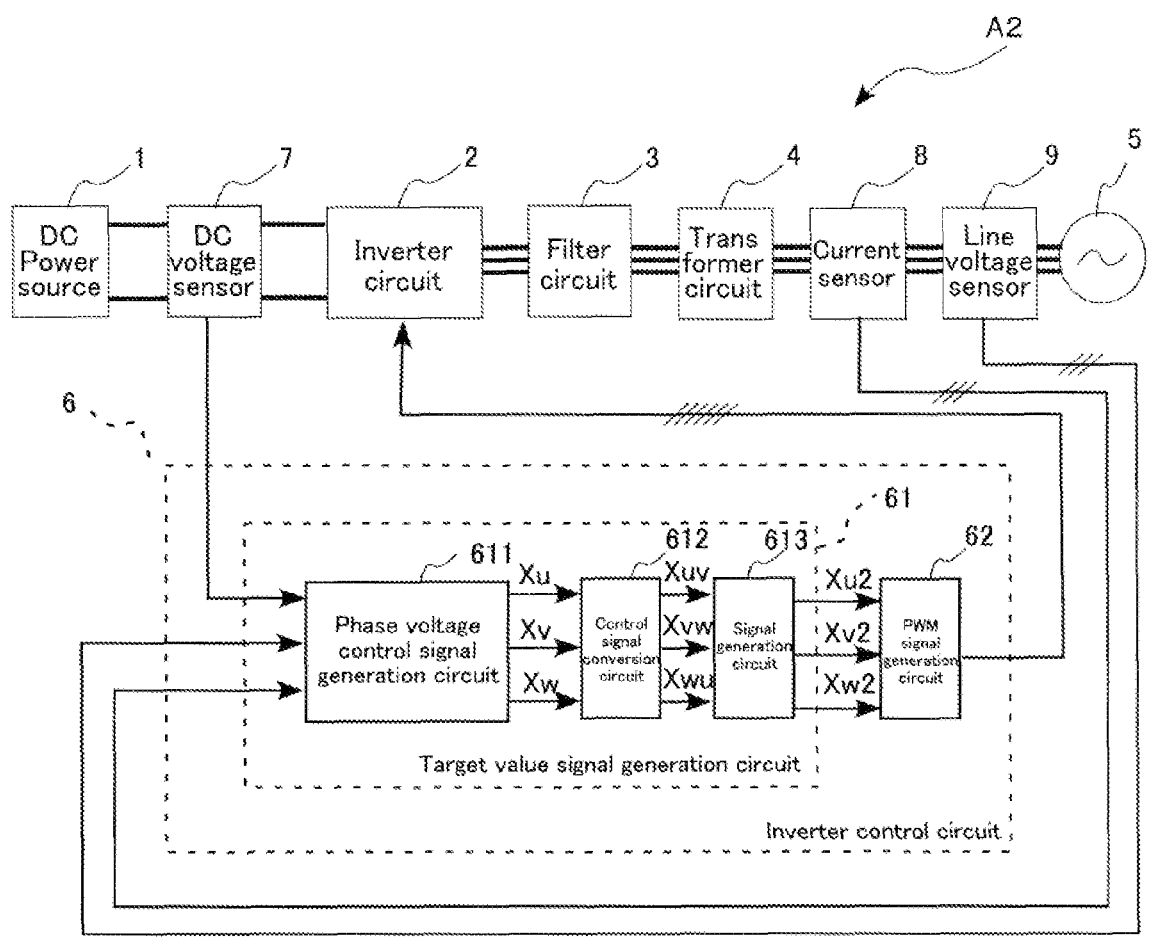
FIG. 10 is a block diagram illustrating an example of a utility interactive inverter system including an inverter control circuit according to a second embodiment of the present invention.

FIG. 10 is a block diagram illustrating an example of a utility interactive inverter system including an inverter control circuit according to a second embodiment of the present invention. In the figure, constituents the same as or similar to those of the first embodiment are given the identical numeral.

In the utility interactive inverter system A2, the DC voltage sensor 7, the current sensor 8, and the line voltage sensor 9 are analog sensors and the detected analog signals are inputted to the target value signal generation circuit 61. The target value signal generation circuit 61 includes the phase voltage control signal generation circuit 611 which are analog processors, the control signal conversion circuit 612, and the signal generation circuit 613, and generates target value signals Xu2, Xv2, Xw2 which are analog signals and outputs such signals to the PWM signal generation circuit 62. The PWM signal generation circuit 62 generates the PWM signals based on the target value signals Xu2, Xv2, Xw2 and outputs the PWM signals to the inverter circuit 2.

The signal generation circuit 613 generates the target value signals Xu2, Xv2, Xw2 from the line voltage control signals Xuv, Xvw, Xwu, the inverted signals Xvu, Xwv, Xuw, and the zero signal constantly having the value of 0. For example, the target value signal Xu2 is generated by inputting the line voltage control signal Xuv, the line voltage control signal Xuw and the zero signal to a comparator and retrieving therefrom a signal of a peak value. The target value signal Xu2 thus generated shows the same waveform as the waveform Vu shown in FIG. 5(c). Likewise, the target value signal Xv2 is generated from the line voltage control signal Xvw, the line voltage control signal Xvu and the zero signal, and the target value signal Xw2 from the line voltage control signal wu, the line voltage control signal Xwv and the zero signal.

The second embodiment can also provide the same advantageous effects as those offered by the first embodiment.

Also, the full-wave rectified signals Xuv', Xvw', Xwu' of the line voltage control signals Xuv, Xvw, Xwu may be employed for generating the target value signals Xu2, Xv2, Xw2.

Figure 11:
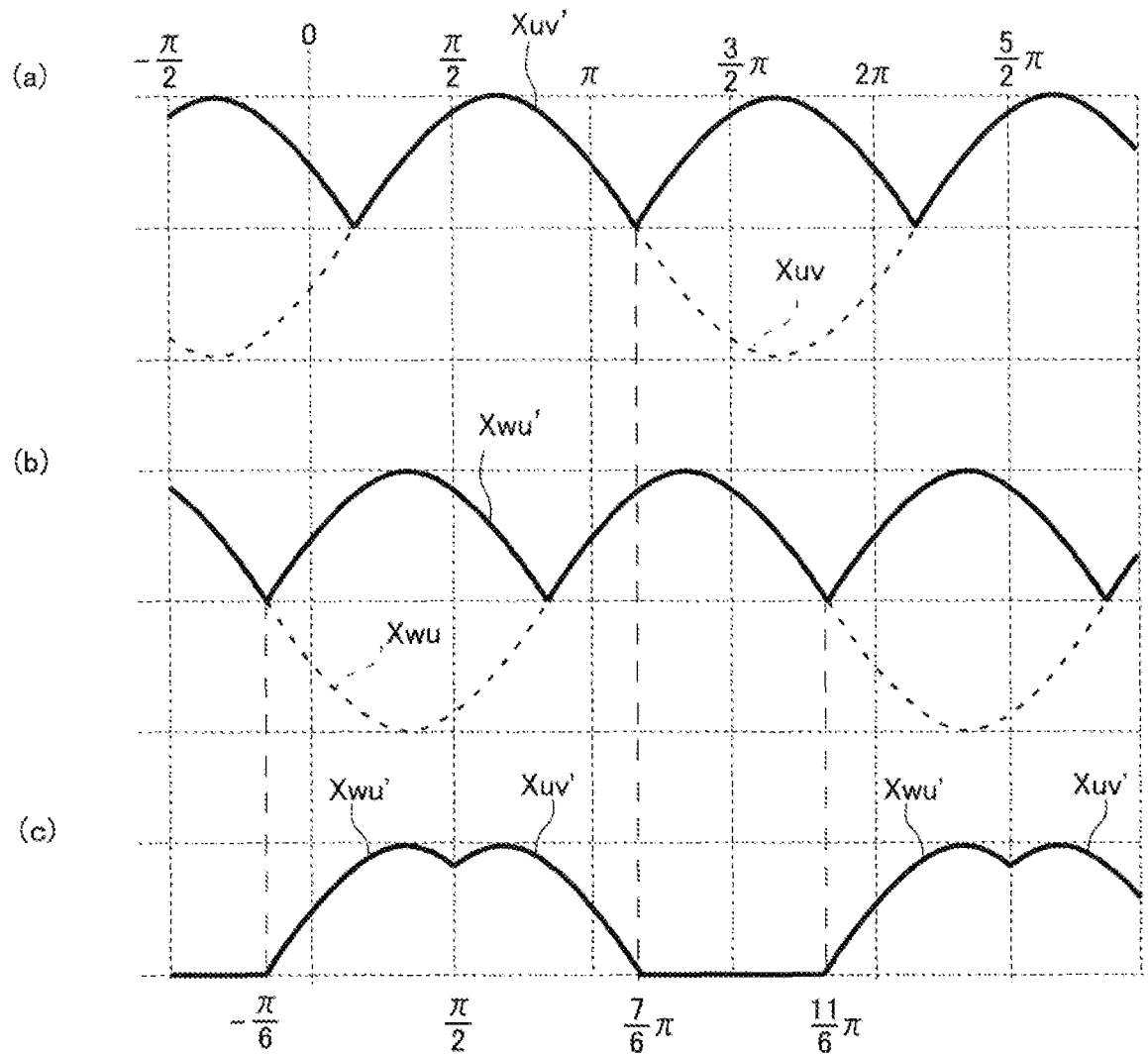
FIG. 11 is a diagram describing a method of generating a target value signal utilizing a full-wave rectified signal.
Figure 12:
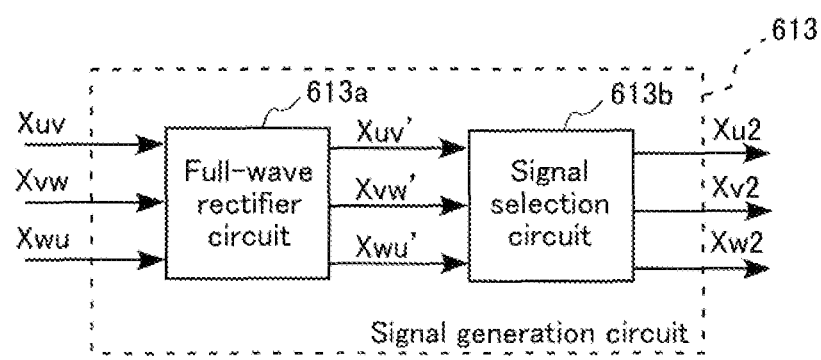
FIG. 12 is a block diagram illustrating a configuration of a signal generation circuit for carrying out the method of generating the target value signal utilizing the full-wave rectified signal.

FIG. 11 is a diagram describing a method of generating the target value signals Xu2, Xv2, Xw2 utilizing the full-wave rectified signals Xuv', Xvw', Xwu'. FIG. 12 is a block diagram illustrating a configuration of the signal generation circuit 613 for carrying out such method.

As shown in FIG. 12, the signal generation circuit 613 includes a full-wave rectifier circuit 613a and a signal selection circuit 613b. The full-wave rectifier circuit 613a performs full-wave rectification of the line voltage control signals Xuv, Xvw, Xwu inputted thereto and outputs full-wave rectified signals Xuv', Xvw', Xwu'. In FIG. 11(a), the broken line represents the line voltage control signal Xuv, and the solid line represents the full-wave rectified signal Xuv' obtained by the full-wave rectification of the line voltage control signal Xuv. In FIG. 11(b), the broken line represents the line voltage control signal Xwu, and the solid line represents the full-wave rectified signal Xwu' obtained through the full-wave rectification of the line voltage control signal Xwu.

The signal selection circuit 613b generates and outputs the target value signals Xu2, Xv2, Xw2 based on the full-wave rectified signals Xuv', Xvw', Xwu' inputted from the full-wave rectifier circuit 613a. The signal selection circuit 613b switches the signal to be output according to the phase of the system voltage, thereby outputting the target value signal. FIG. 11(c) illustrates the target value signal Xu2 outputted by the signal selection circuit 613b. If it is assumed U-phase of the system voltage is set as the reference phase, the full-wave rectified signals Xwu' is outputted while the reference phase is between $-\pi/6$ and $\pi/2$; the full-wave rectified signals Xuv' is outputted while the reference phase is between $\pi/2$ and $7\pi/6$; and the zero signal is outputted while the reference phase is between $7\pi/6$ and $11\pi/6$. The signal thus outputted is denoted as the target value signal Xu2. Likewise, the target value signal Xv2 is outputted by sequentially outputting the full-wave rectified signals Xvw', the full-wave rectified signals Xuv' and the zero signal; the target value signal Xw2 is outputted by sequentially outputting the full-wave rectified signals Xwu', the full-wave rectified signals Xvw' and the zero signal.

Although the line voltage control signal is employed for generating the target value signal in the first and the second embodiment, different methods may be adopted. For example, the phase voltage of each of the phases may be set to match with the potential at the cathode of the DC power source 1 (hereinafter, "DC cathode potential") every one third of the cycle.

Figure 13:
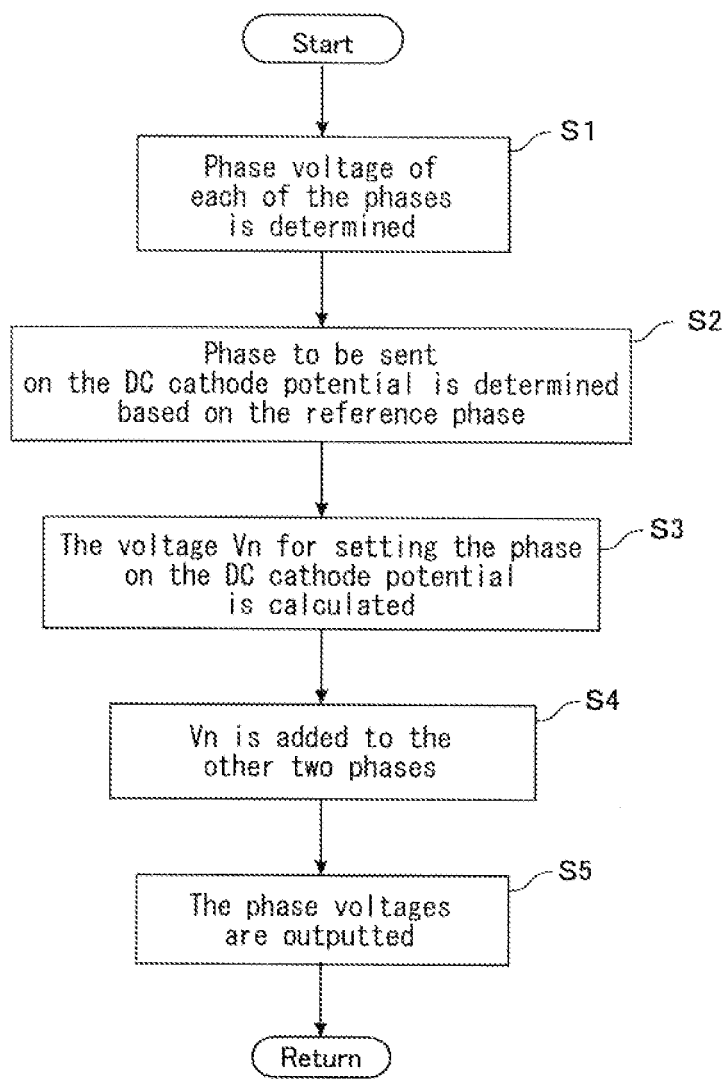
FIG. 13 is a flowchart describing a method of controlling such that the phase voltage of each phase accords with a DC cathode potential of a DC power source, at every one third of the cycle.

FIG. 13 is a flowchart describing a method of controlling such that the phase voltage of each of the phases matches with the DC cathode potential of the DC power source 1, every one third of the cycle.

According to the controlling method, the phase to be fixed on the DC cathode potential is determined in advance, based on the reference phase. It is to be determined, for example, such that U-phase is fixed on the DC cathode potential while the reference phase is between $-\pi/3(=-60°)$ and $\pi/3(=60°)$; W-phase is fixed on the DC cathode potential while the reference phase is between $\pi/3(=60°)$ and $\pi(=180°)$; and V-phase is fixed on the DC cathode potential while the reference phase is between $\pi(=180°)$ and $5\pi/3(=300°)$.

First, the phase voltage of each of the phases is determined (S1), and the phase to be set on the DC cathode potential is determined based on the reference phase (S2). Then the voltage Vn for setting the phase on the DC cathode potential is calculated (S3), and Vn is added to the other two phases (S4). The phase voltages of the respective phases thus calculated are outputted (S5).

The phase voltages of U-phase, V-phase, and W-phase are denoted as Vu, Vv, Vw, respectively, and the phase voltages after the adjustment as Vu', Vv', Vw', respectively. While the reference phase is between −60° and 60°, U-phase is fixed on the DC cathode potential, and hence the voltage V n corresponds to −Vu. Accordingly, the adjusted voltages can be expressed as Vu'=0, Vv'=Vv−Vu, and Vw'=Vw−Vu. W-phase is fixed on the DC cathode potential while the reference phase is between 60° and 180°, and hence the voltage V n corresponds to −Vw. Accordingly, the adjusted voltages can be expressed as Vu'=Vu−Vw, Vv'=Vv−Vw, and Vw'=0. V-phase is fixed on the DC cathode potential while the reference phase is between 180° and 300°, and hence the voltage V n corresponds to −Vv. Accordingly, the adjusted voltages can be expressed as Vu'=Vu−Vv, Vv'=0, and Vw'=Vw−Vv.

When the line voltages of U-phase, V-phase, and W-phase are denoted as Vuv, Vvw, Vwu respectively, these voltages can be expressed as Vuv=Vu'−Vv', Vvw=Vv'−Vw', and Vwu=Vw'−Vu'. While the reference phase is between −60° and 60°, the line voltage Vuv can be expressed as Vuv=Vu'−Vv'=0−(Vv−Vu)=Vu−Vv; while the reference phase is between 60° and 180°, the line voltage Vuv can be expressed as Vuv=Vu'−Vv'=(Vu−Vw)−(Vv−Vw)=Vu−Vv; and while the reference phase is between 180° and 300°, the line voltage Vuv can be expressed as Vuv=Vu'−Vv'=(Vu−Vv)−0=Vu−Vv. Thus, Vuv=Vu−Vv is established in all the periods. Likewise, Vvw=Vv−Vw and Vwu=Vw−Vu can be established, and the respective line voltages representing the differences of the phase voltages after the adjustment match with the difference of the initial phase voltages. Consequently, each line voltage output from the inverter circuit 2 can be synchronized with the system voltage.

Figure 14:
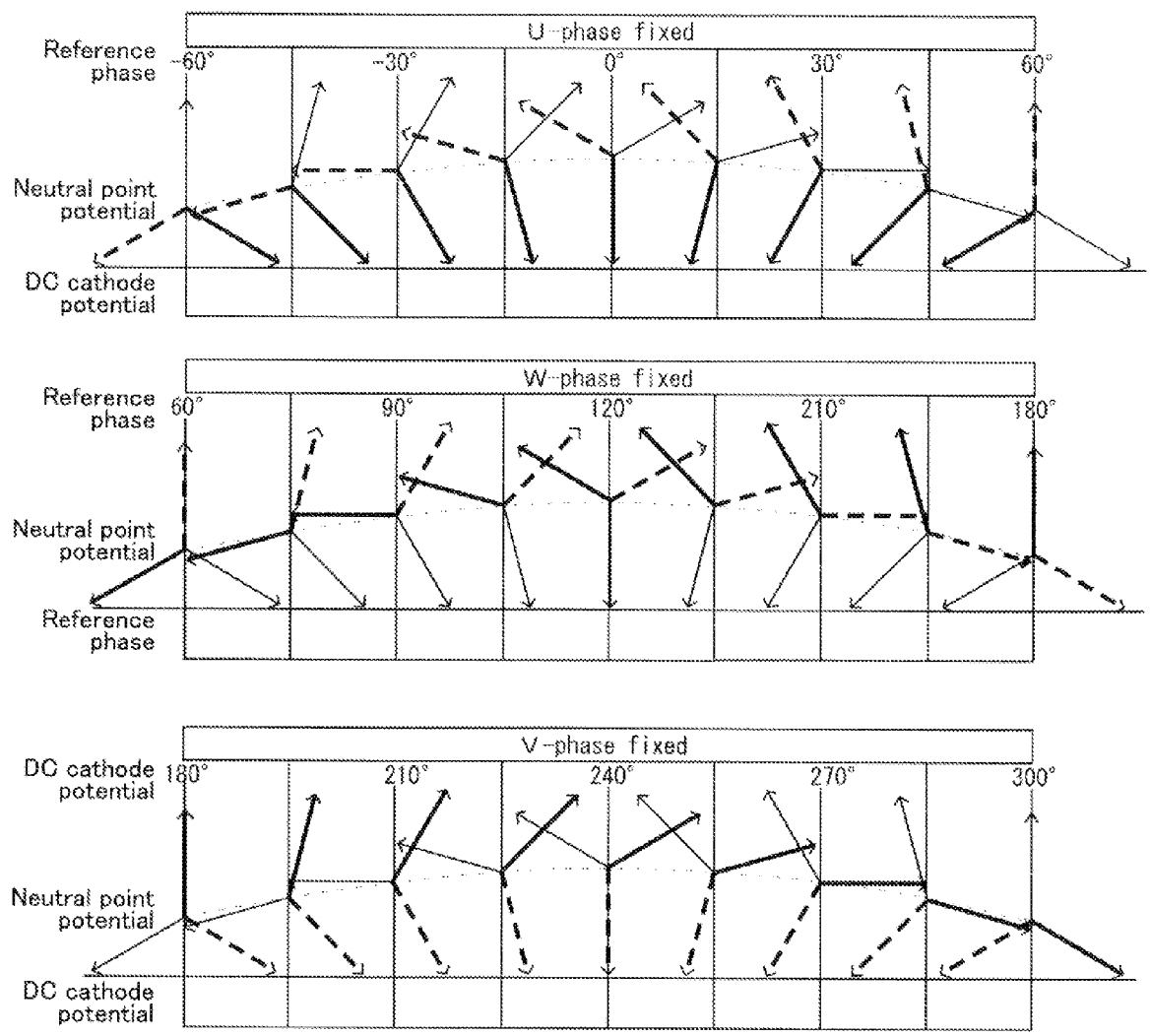
FIG. 14 is a vector transition diagram describing the controlling method of FIG. 13.

FIG. 14 is a vector transition diagram describing the foregoing controlling method. While the reference phase is between −60° and 60°, the tips of the vectors representing the U-phase voltage (bold line arrow in the figure) are fixed on the DC cathode potential; while the reference phase is between 60° and 180° the tips of the vectors representing the W-phase voltage (fine line arrow in FIG. 14) are fixed on the DC cathode potential; and while the reference phase is between 180° and 300° the tips of the vectors representing the V-phase voltage (dotted line arrow in FIG. 14) are fixed on the DC cathode potential.

An inverter control circuit that allows performing the foregoing controlling method will now be described below.

Figure 15:
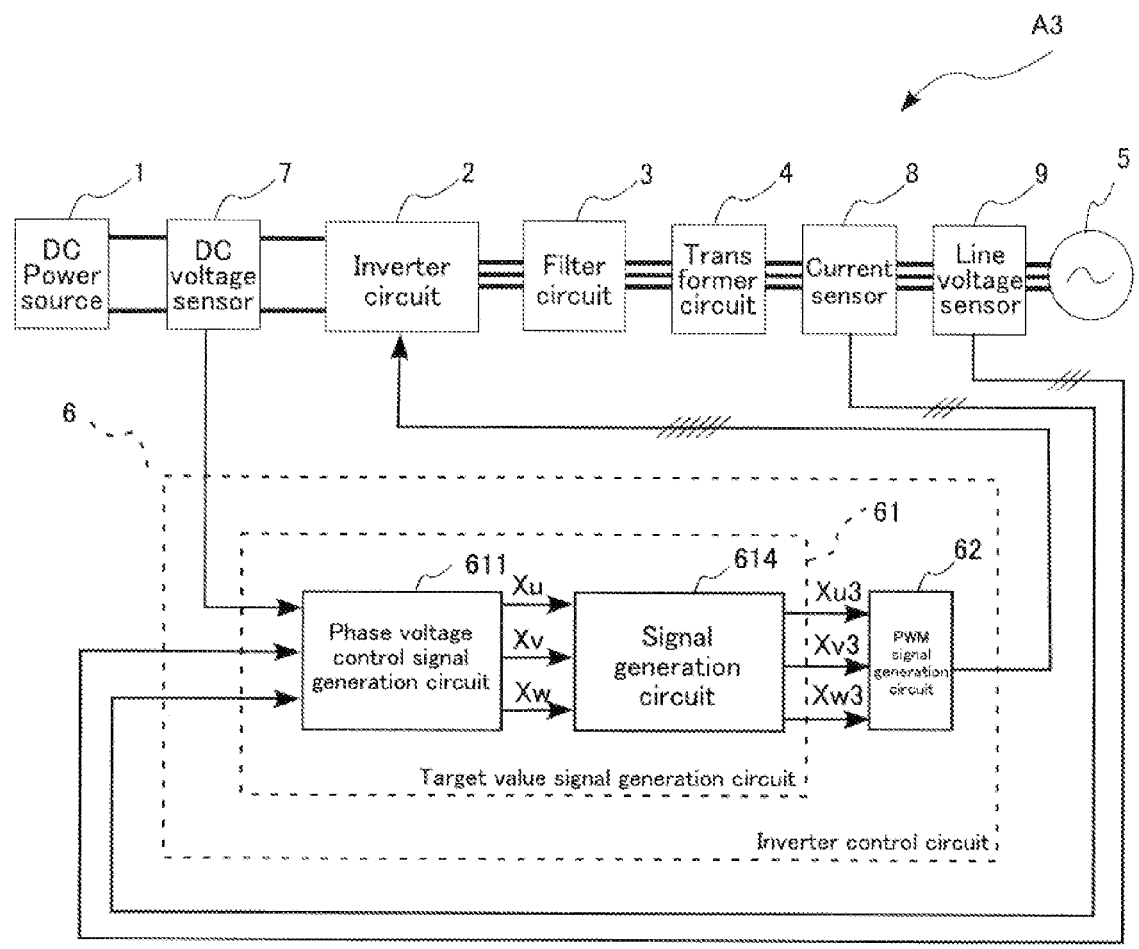
FIG. 15 is a block diagram illustrating an example of a utility interactive inverter system including an inverter control circuit according to a third embodiment of the present invention.

FIG. 15 is a block diagram illustrating an example of a utility interactive inverter system including an inverter control circuit according to a third embodiment of the present invention. In the figure, constituents the same as or similar to those of the first embodiment are given the identical numeral.

The inverter control circuit 6 of the utility interactive inverter system A3 is different from that of the first embodiment in inclusion of a signal generation circuit 614 in place of the control signal conversion circuit 612 and the signal generation circuit 613.

The signal generation circuit 614 generates the target value signals Xu3, Xv3, Xw3 based on the phase voltage control signals Xu, Xv, Xw inputted thereto. The signal generation circuit 614 sets the target value signals Xu3, Xw3, Xv3 at zero in this order every one-third of the cycle, and generates the target value signal by subtracting the phase voltage control signal of the phase set at zero, from the phase voltage control signals of each of the phases, thus carrying out the controlling method shown in FIG. 13.

Figure 16:
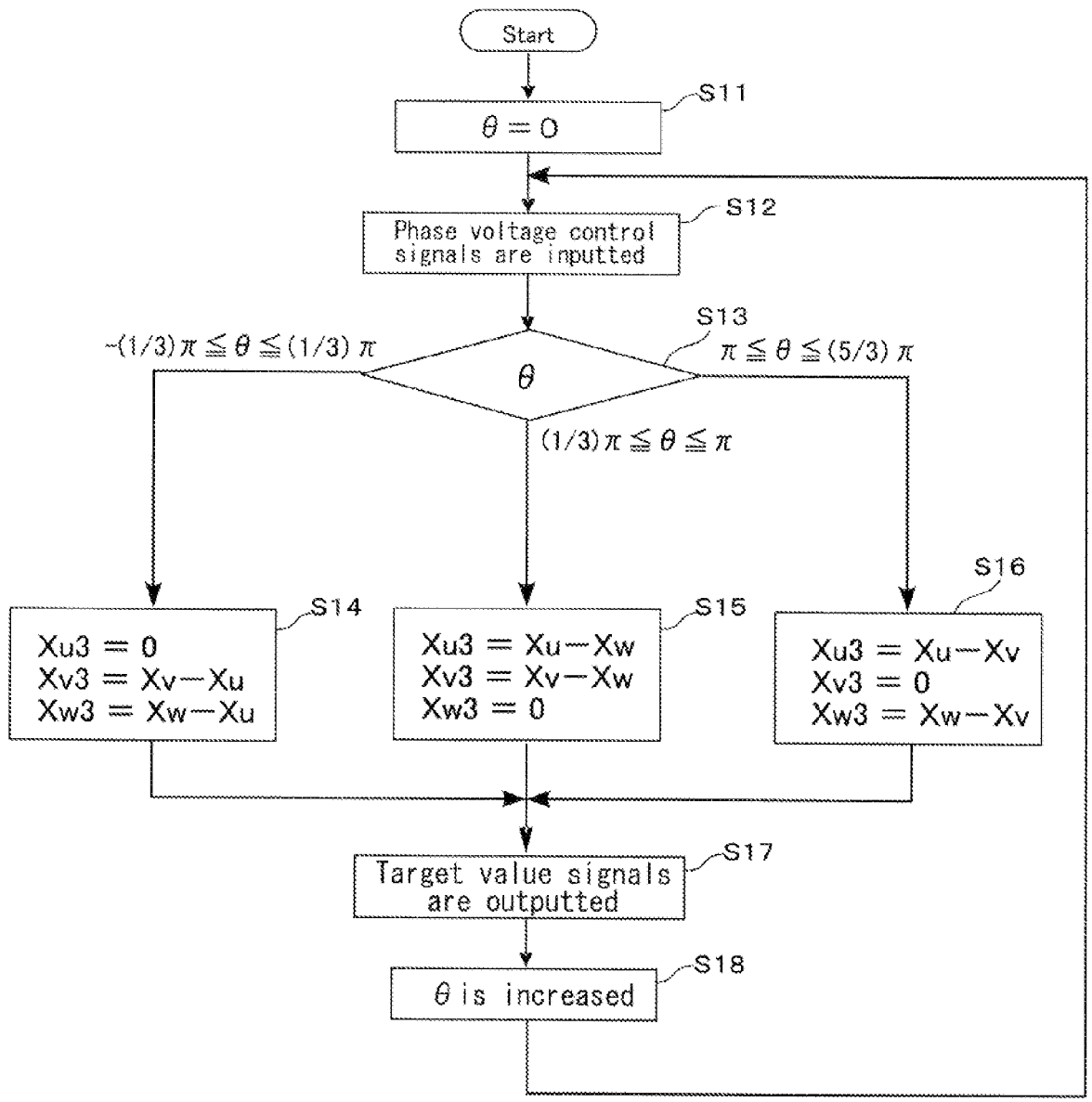
FIG. 16 is a flowchart describing a process executed in the signal generation circuit.

FIG. 16 is a flowchart describing a process executed in the signal generation circuit 614.

First, the reference phase θ is initialized as 0 (S11). Then, the respective phase voltage control signals of the phases are inputted (S12), and the reference phase is determined (S13). In the case of $-\pi/3 \leq \theta \leq <\pi/3$, the target value signal Xu3 is set at zero; the target value signal Xv3 is generated by subtracting the phase voltage control signal Xu from the phase voltage control signal Xv; and the target value signal Xw3 is generated by subtracting the phase voltage control signal Xu from the phase voltage control signal Xw (S14). In the case of $\pi/3 \leq \theta \leq \pi$, the target value signal Xw3 is set at zero; the target value signal Xu3 is generated by subtracting the phase voltage control signal Xw from the phase voltage control signal Xu; and the target value signal Xv3 is generated by subtracting the phase voltage control signal Xw from the phase voltage control signal Xv (S15). In the case of $\pi \leq \theta$ $5\pi/3$, the target value signal Xv3 is set at zero; the target value signal Xu3 is generated by subtracting the phase voltage control signal Xv from the phase voltage control signal Xu; and the target value signal Xw3 is generated by subtracting the phase voltage control signal Xv from the phase voltage control signal Xw (S16). These target value signals Xu3, Xv3, Xw3 are outputted to the PWM signal generation circuit 62 (S17), and the reference phase θ is increased (S18), after which the process returns to the step S12.

Here, when the third embodiment is to be implemented, a phase shift incidental to the harmonic control has to be taken into consideration.

The third embodiment also provides the same advantageous effects as those offered by the first embodiment.

Although the first to the third embodiments refer to the PWM signal generation circuit based on the triangle wave comparison method of generating the PWM signal through comparison between the target value signal and the carrier signal, the PWM signal generation circuit may include a circuit that generates the PWM signal through a different process, without limitation to the above. For example, a PWM hold procedure may be adopted to obtain the pulse width through calculation, thereby generating the PWM signal based on the calculated pulse width.

Figure 17:
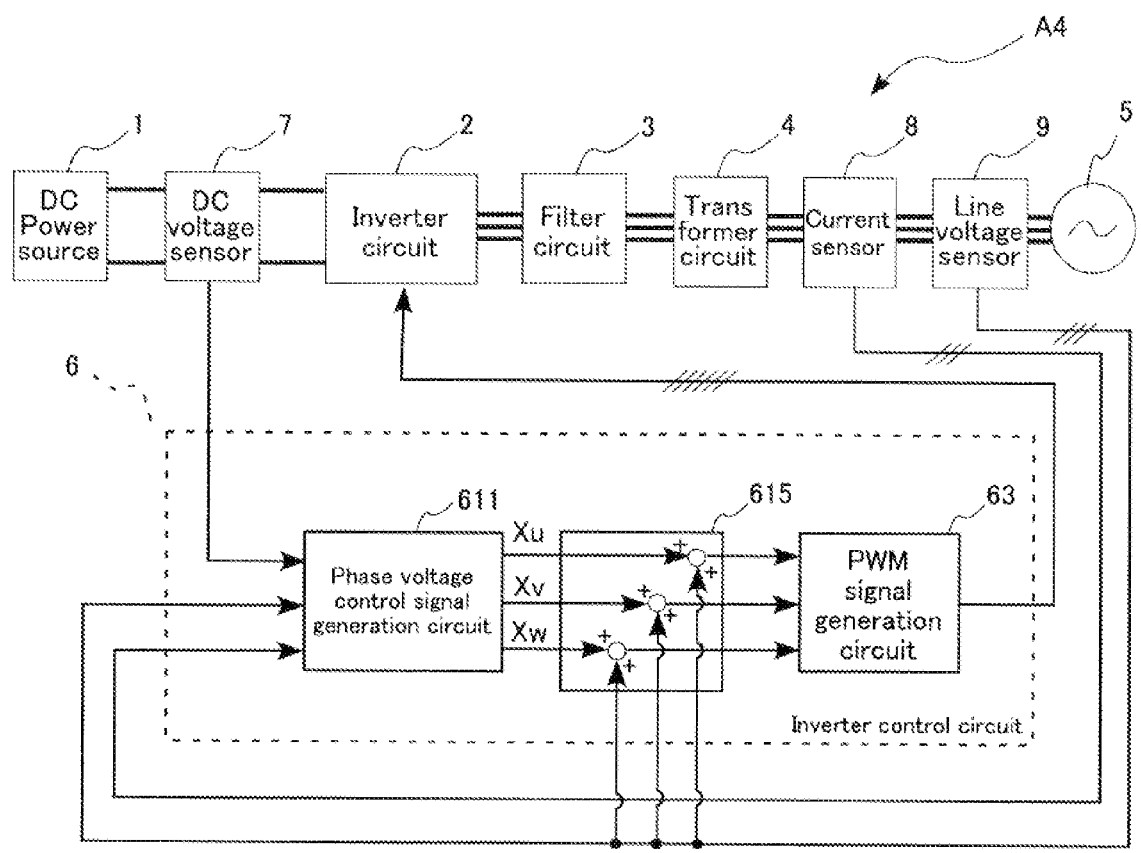
FIG. 17 is a block diagram illustrating an example of a utility interactive inverter system including an inverter control circuit according to a fourth embodiment of the present invention.

FIG. 17 is a block diagram illustrating an example of a utility interactive inverter system including an inverter control circuit according to a fourth embodiment of the present invention. In the figure, constituents the same as or similar to those in the block diagram of FIG. 6 showing the first embodiment are given the identical numeral.

The inverter control circuit 6 of the utility interactive inverter system A4 calculates the pulse width by the PWM hold procedure based on the line voltage signal input from the line voltage sensor 9, and generates the PWM signal based on the pulse width, instead of generating the PWM signal through comparison between the target value signal and the carrier signal. Accordingly, FIG. 17 is different from the block diagram of FIG. 6 in including a line voltage correction circuit 615 in place of the control signal conversion circuit 612 and the signal generation circuit 613, and a PWM signal generation circuit 63 in place of the PWM signal generation circuit 62. Here, regarding the value calculated through the PWM hold procedure, the absolute value thereof represents the pulse width, and whether that value is positive or negative determines the polarity of the pulse waveform. Hereinafter, accordingly, the value calculated through the PWM hold procedure will be referred to as the "pulse width value", which also includes the polarity of the pulse waveform.

The line voltage correction circuit 615 serves to correct the respective line voltage signals of the phases detected by the line voltage sensor 9, by adding the phase voltage control signals Xu, Xv, Xw outputted from the phase voltage control signal generation circuit 611 to the respective line voltage signals. The line voltage correction circuit 615 outputs the corrected line voltage signals to the PWM signal generation circuit 63.

The PWM signal generation circuit 63 calculates the pulse width value through the PWM hold procedure based on the corrected line voltage signals input from the line voltage correction circuit 615. Since the PWM hold procedure is well-known, the description thereof will be omitted.

The pulse width value calculated through the PWM hold procedure based on the line voltage signal serves to control the voltage between the output lines of the respective phases. The PWM signal input to the inverter circuit 2 is, however, supposed to control the output phase voltage of the respective phases. Accordingly, the PWM signal generation circuit 63 determines the pulse waveform for controlling the output phase voltage of U-phase, V-phase, and W-phase based on the calculated pulse width value for controlling the voltage between the output lines of the respective phases, and outputs such pulse waveform to the inverter circuit 2, as the PWM signal.

Figure 18:
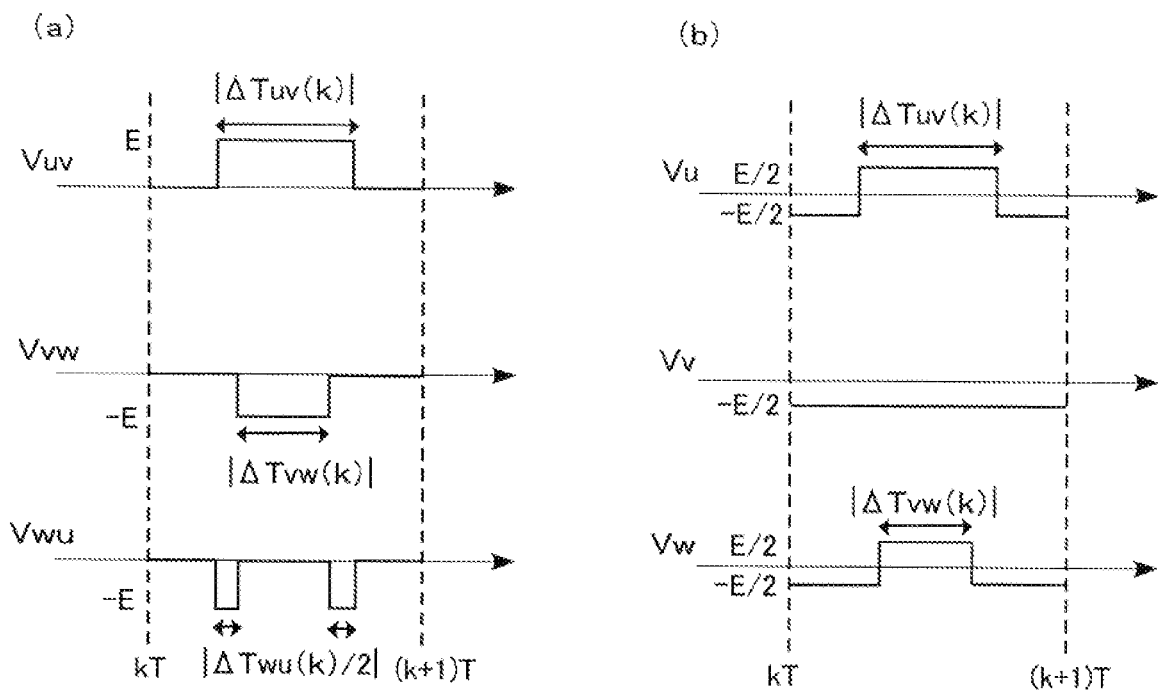
FIG. 18 is a diagram showing a relation between the line voltage waveform and the phase voltage waveform, in the case where the pulse width value of a largest absolute value is positive.
Figure 19:
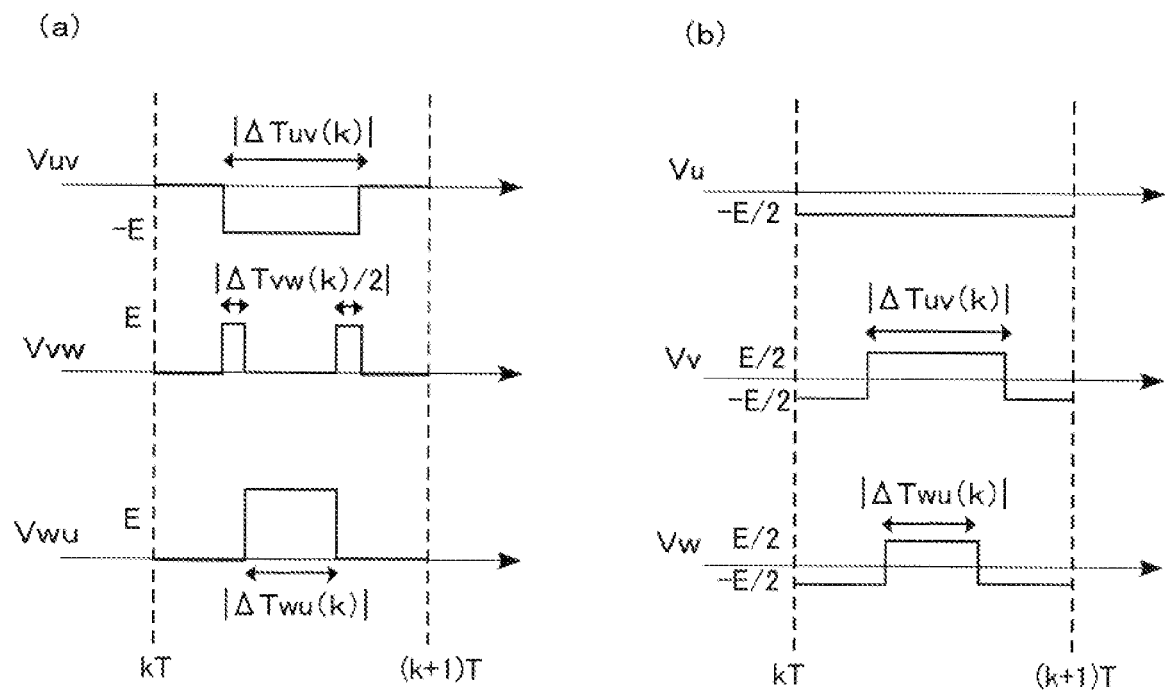
FIG. 19 is a diagram showing a relation between the line voltage waveform and the phase voltage waveform, in the case where the pulse width value of a largest absolute value is negative.
Figure 20:
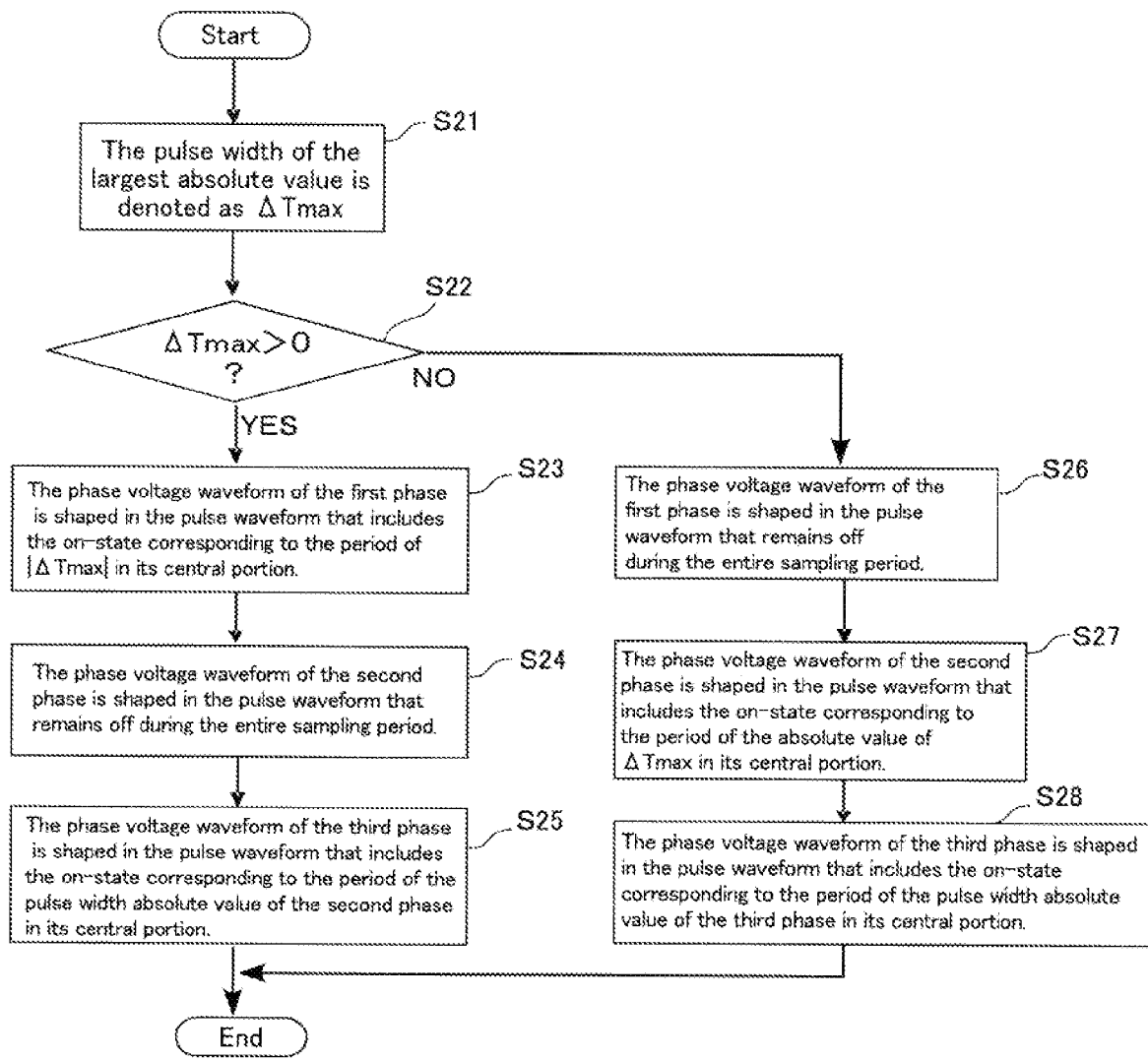
FIG. 20 is a flowchart showing a procedure for determining each phase voltage waveform.

Referring now to FIGS. 18 to 20, a rule to determine a pulse waveform for controlling the output phase voltage of the respective phases will be described below. In the fourth embodiment, the PWM signal generation circuit 63 changes the rule to determine the pulse waveform for controlling the output phase voltage of the respective phases depending on whether the pulse width of the largest absolute value among the three calculated pulse widths is of a positive value.

FIG. 18 is a diagram showing a relation between the pulse waveform for controlling the voltage between the output lines (hereinafter, "line voltage waveform") and the pulse waveform for controlling the output phase voltage (hereinafter, "phase voltage waveform"), in the case where the pulse width value of the largest absolute value is positive. (a) in the figure illustrates each line voltage waveform in a sampling period (kT to (k+1)T). In this example, ΔTuv(k), ΔTvw(k), and ΔTwu(k) are calculated as the pulse, width of U-phase, V-phase, and W-phase respectively, and the relation can be expressed as |ΔTuv(k)|>|ΔTvw(k)|>|ΔTwu(k)|, ΔTuv(k)>0, and ΔTvw(k), ΔTwu(k)<0. Also, the total of the line voltages has to always be zero.

The waveforms of the line voltage Vuv from U-phase to V-phase, the line voltage Vvw from V-phase to W-phase, and the line voltage Vwu from W-phase to U-phase are illustrated from the top in (a) in the figure. The waveform of the U-phase line voltage Vuv having the largest pulse width absolute value assumes a pulse waveform that includes in its central portion an on-state corresponding to the period of the absolute value |ΔTuv(k)| of the calculated pulse width value. The voltage in the on-state is set as E, and the voltage in the off-state as zero. The waveform of the line voltage Vvw of V-phase following U-phase assumes a pulse waveform that includes in its central portion the on-state of the negative polarity corresponding to the period of the absolute value |ΔTvw(k)| of the calculated pulse width value. The voltage in the on-state of the negative polarity is set as −E. Also, the waveform of the line voltage Vwu of W-phase following V-phase assumes a pulse waveform that includes the on-states of the negative polarity corresponding to half the period of the absolute value |ΔTwu(k)| of the calculated pulse width value, at the positions corresponding to outside of the respective end portions of the on-state period of the pulse waveform of the line voltage Vvw. In this case, the total of these line voltages (=Vuv+Vvw+Vwu) is constantly zero.

The phase voltage waveforms of the phases in the same sampling periods, converted from the line voltage waveforms are shown in (a) in the figure, are illustrated in (b) in the figure.

The waveforms of the U-phase voltage Vu, V-phase voltage Vv, W-phase voltage Vw are shown from the top in (b) in the FIG. 18. Since the absolute value of the U-phase pulse width ΔTuv(k) is the largest, the waveform of the phase voltage Vu is a pulse waveform that includes in its central portion the on-state corresponding to the period of the absolute value |ΔTuv(k)| of the pulse width value. The voltage in the on-state is set as (½)E, and the voltage in the off-state as −(½)E. The waveform of the V-phase voltage Vv following U-phase remains off through the entire sampling period. The voltage in the off-state is set as −(½)E. Also, the waveform of the W-phase voltage Vw following V-phase is a pulse waveform that includes in its central portion the on-state corresponding to the period of the pulse width absolute value |ΔTvw(k)| of the preceding V-phase. Here, the voltage in the on-state is set as (½)E, and the voltage in the off-state as −(½)E.

The line voltage waveforms can be easily confirmed based on such converted phase voltage waveforms. For example, by subtracting the Vv waveform from the Vu waveform of (b) in the figure according to Vuv=Vu−Vv, Vuv becomes E/2−(−E/2)=E in the period where Vu is E/2, and −E/2−(−E/2)=0 in the period where Vu is −E/2, which results in an identical waveform to the Vuv waveform of (a) in the figure. Likewise, by subtracting the Vw waveform from the Vv waveform of (b) in the figure according to Vvw=Vv−Vw, Vvw becomes −E/2−(+E/2)=−E in the period where Vw is E/2, and −E/2−(−E/2)=0 in the period where Vw is −E/2, which results in an identical waveform to the Vvw waveform of (a) in the figure. Further, by subtracting the Vu waveform from the Vw waveform of (b) in the figure according to Vwu=Vw−Vu, Vwu becomes E/2−(+E/2)=0 in the period where Vu is E/2, −E/2−(−E/2)=0 in the period where Vu is −E/2, and −E/2−(+E/2)=−E in the period where Vw is −E/2 and Vu is E/2, which results in an identical waveform to the Vwu waveform of (a) in the figure.

FIG. 19 is a diagram showing a relation between the line voltage waveform and the phase voltage waveform, in the case where the pulse width of the largest absolute value is negative. In (a) in the figure, the waveforms of the line voltages Vuv, Vvw, Vwu in the same sampling period (kT to (k+1)T) as that of FIG. 18 are shown. In this example, the relation among the pulse widths ΔTuv(k), ΔTvw(k), and ΔTwu(k) can be expressed as |ΔTuv(k)|>|ΔTwu(k)|>|ΔTvw(k)|, ΔTuv(k)<0, and ΔTvw(k), ΔTwu(k)>0. Also, the total of the line voltages (=Vuv+Vvw+Vwu) has to always be zero.

In this case, the waveform of the U-phase line voltage Vuv having the largest pulse width absolute value is a pulse waveform that includes in its central portion the on-state of the negative polarity corresponding to the period of the absolute value |ΔTuv(k)| of the calculated pulse width value. The voltage in the on-state is set as −E, and the voltage in the off-state as zero. The waveform of the line voltage Vvw of V-phase following U-phase assumes a pulse waveform that includes the on-states corresponding to half the period of the absolute value |ΔTvw(k)| of the calculated pulse width value, at the positions corresponding to outside of the respective end portions of the on-state period of the pulse waveform of the line voltage Vuv. The voltage in the on-state is set as E. Also, the waveform of the line voltage Vwu of W-phase following V-phase is a pulse waveform that includes in its central portion the on-state corresponding to the period of the absolute value |ΔTwu(k)| of the calculated pulse width value. In this case, the total of these line voltages (=Vuv+Vvw+Vwu) is constantly zero.

FIG. 19(b) illustrates the phase voltage waveforms Vu, Vv, Vw of the same sampling periods, converted from the line voltage waveforms shown in (a) in the figure.

In this example, since the absolute value of the U-phase pulse width ΔTuv(k) is the largest, the waveform of the phase voltage Vu remains off through the entire sampling period. The voltage in the off-state is set as −(½)E. The waveform of the V-phase voltage Vv following U-phase assumes a pulse waveform that includes in its central portion the on-state corresponding to the period of the pulse width absolute value |ΔTuv(k)|, which is the largest. The voltage in the on-state is set as (½)E, and the voltage in the off-state as −(½)E. Also, the waveform of the W-phase voltage Vw following V-phase assumes a pulse waveform that includes in its central portion the on-state corresponding to the period of the pulse width absolute value |ΔTwu(k)| of the same W-phase. Here, the voltage in the on-state is set as (½)E, and the voltage in the off-state as −(½)E.

Even in the case where the pulse width value of the largest absolute value is negative, the line voltage waveforms can be easily confirmed based on such converted phase voltage waveforms. For example, upon subtracting the Vv waveform from the Vu waveform of (b) in the figure, Vuv becomes −E/2−(+E/2)=−E in the period where Vv is E/2, and −E/2−(−E/2)=0 in the period where Vv is −E/2, which results in an identical waveform to the Vuv waveform of (a) in the figure. Likewise, upon subtracting the Vw waveform from the Vv waveform of (b) in the figure, Vvw becomes E/2−(+E/2)=0 in the period where Vw is E/2, −E/2−(−E/2)=0 in the period where Vv is −E/2, and E/2−(−E/2)=E in the period where Vv is E/2 and Vw is −E/2, which results in an identical waveform to the Vvw waveform of (a) in the figure. Further, upon subtracting the Vu waveform from the Vw waveform of (b) in the figure, Vwu becomes E/2−(−E/2)=E in the period where Vw is E/2, and −E/2−(−E/2)=0 in the period where Vw is −E/2, which results in an identical waveform to the Vwu waveform of (a) in the figure.

FIG. 20 is a flowchart showing a procedure for deciding each phase voltage waveform, executed in the PWM signal generation circuit 63. The PWM signal generation circuit 63 calculates the pulse width at the start of each sampling period kT. The procedure is started once the PWM signal generation circuit 63 calculates the pulse width of the respective phases.

First, the pulse width of the largest absolute value among the three calculated pulse widths is denoted as ΔTmax (S21). The phase in which ΔTmax has been calculated is designated as a first phase, the phase following the first phase as a second phase, and the phase following the second phase as a third phase. In the examples shown in FIGS. 18 and 19, ΔTmax=ΔTuv(k) is established, and U-phase, V-phase, and W-phase correspond to the first phase, the second phase, and the third phase, respectively. Then, it is determined whether ΔTmax is positive or not (S22). Here, since it is impossible that all of the pulse widths become zero, the case of ΔTmax=0 will not be taken into consideration.

In the case where ΔTmax is positive (S22: YES), the phase voltage waveform of the first phase is shaped in the pulse waveform that includes the on-state corresponding to the period of |ΔTmax| in its central portion (S23); the phase voltage waveform of the second phase is shaped in the pulse waveform that remains off during the entire sampling period (S24); and the phase voltage waveform of the third phase is shaped in a pulse waveform that includes the on-state corresponding to the period of the pulse width absolute value of the second phase in its central portion (S25), and the process is finished.

In the example of FIG. 18, since ΔTuv(k)>0, the U-phase voltage waveform is shaped in the pulse waveform including in its central portion the on-state corresponding to the period of |ΔTuv(k)|; the V-phase voltage waveform is shaped in the pulse waveform that remains off through the entire sampling period; and the W-phase voltage waveform is shaped in the pulse waveform including in its central portion the on-state corresponding to the period of |ΔTvw(k)|.

In the case where ΔTmax is negative (S22: NO), the phase voltage waveform of the first phase is shaped in the pulse waveform that remains off during the entire sampling period (S26); the phase voltage waveform of the second phase is shaped in the pulse waveform that includes the on-state corresponding to the period of the absolute value of ΔTmax in its central portion (S27); and the phase voltage waveform of the third phase is shaped in a pulse waveform that includes the on-state corresponding to the period of the pulse width absolute value of the third phase in its central portion (S25), and the process is finished.

In the example of FIG. 19, since ΔTuv(k)<0, the U-phase voltage waveform is shaped in the pulse waveform that remains off during the entire sampling period; the V-phase voltage waveform is shaped in the pulse waveform including the on-state corresponding to the period of |ΔTuv(k)| in its central portion; and the W-phase voltage waveform is shaped in the pulse waveform including the on-state corresponding to the period of |ΔTwu(k)| in its central portion.

The PWM signal generation circuit 63 outputs the PWM signal, which includes a low level portion corresponding to the off-state of the determined phase voltage waveforms of the phases and a high level portion corresponding to the on-state thereof, to the inverter circuit 2. In practice, the low level is already outputted as the PWM signal from the start kT of each sampling period, and the foregoing process of deciding the phase voltage waveform (hereinafter, "phase voltage waveform decision process") is executed before entering the high level, for switching to the high-level voltage at the timing according to each phase voltage waveform decided as above.

Here, the pulse width may be calculated and the phase voltage waveform decision process may be executed prior to the start kT of each sampling period. In this case, the PWM signal is outputted according to the respective phase voltage waveforms decided as above.

By executing the phase voltage waveform decision process, the PWM signal generation circuit 63 appropriately determines the pulse waveform for controlling the output phase voltage of the respective phases based on the calculated pulse width, and outputs such pulse waveform as the PWM signal, to the inverter circuit 2.

Figure 21:
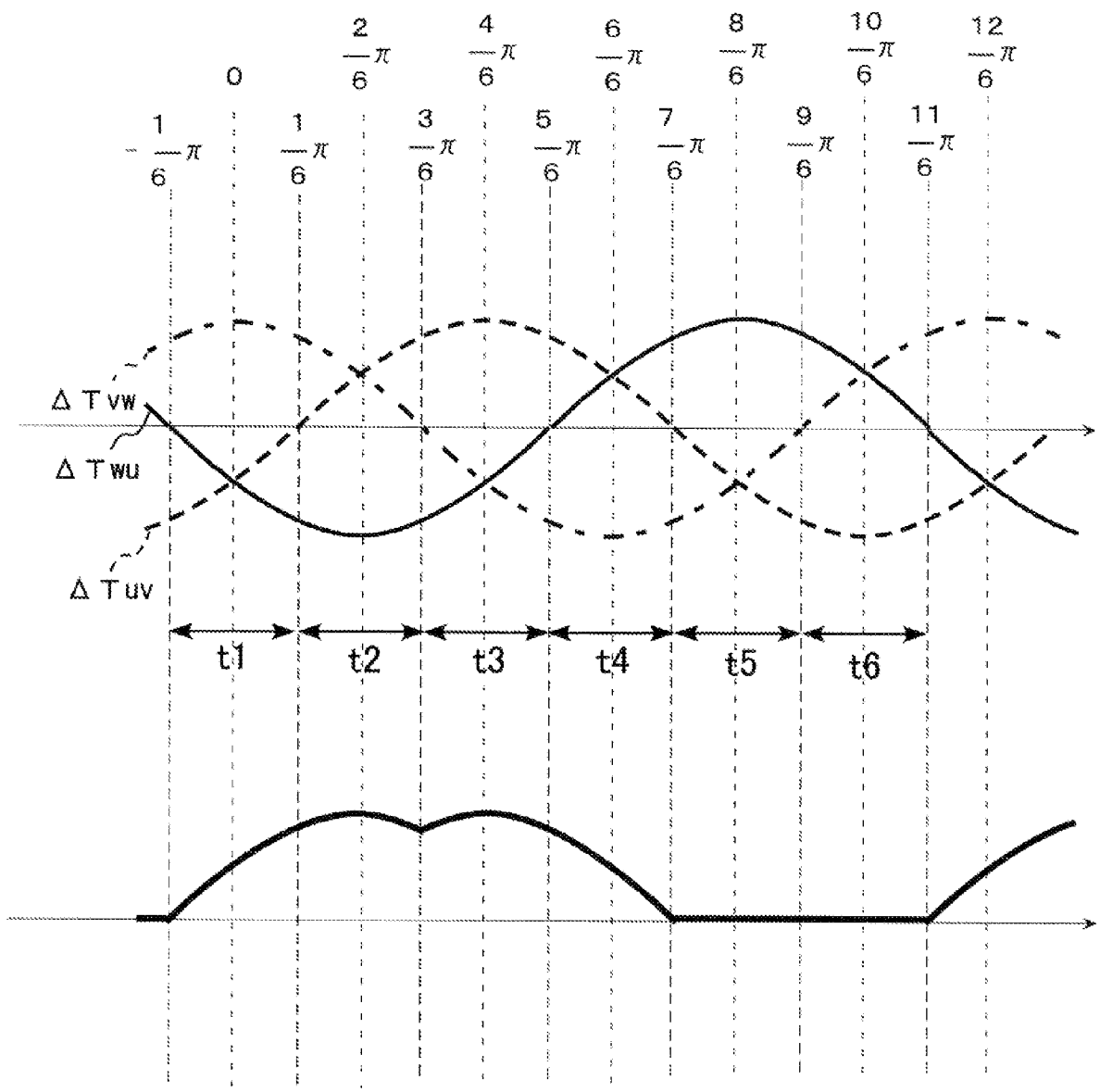
FIG. 21 is a diagram describing a relation between a pulse width value calculated by a PWM hold procedure and a pulse width of a pulse waveform determined by the phase voltage waveform decision process.

FIG. 21 is a diagram describing a relation between the pulse width value calculated through the PWM hold procedure and the pulse width of the pulse waveform decided through the phase voltage waveform decision process.

The broken line in an upper region in the figure represents the transition with time of the U-phase pulse width ΔTuv calculated through the PWM hold procedure. Likewise, the dash-dot line represents the transition with time of the V-phase pulse width ΔTvw, and the solid line represents the transition with time of the W-phase pulse width ΔTwu. As shown in the figure, the transition of the pulse width of the respective phases calculated through the PWM hold procedure forms sine wave curves with the phase shifted by 2π/3 from each other.

In the figure, the absolute value of ΔTvw becomes the largest in the period t1, and ΔTvw >0 (YES at S22 of FIG. 20). Accordingly, the V-phase voltage waveform, corresponding to the first phase, becomes the pulse waveform including in its central portion the on-state corresponding to the period of ΔTvw (S23 of FIG. 20). Likewise, the W-phase voltage waveform corresponding to the second phase becomes the waveform that remains off through the entire period (S24 of FIG. 20). Further, the U-phase voltage waveform corresponding to the third phase becomes the pulse waveform including in its central portion the on-state corresponding to the period of |ΔTwu| (S25 of FIG. 20).

In the period t2, the absolute value of ΔTwu becomes the largest, and ΔTwu is negative (NO at S22 of FIG. 20). Accordingly, the W-phase voltage waveform, corresponding to the first phase, becomes the waveform that remains off through the entire period (S26 of FIG. 20). Likewise, the U-phase voltage waveform corresponding to the second phase becomes the pulse waveform including in its central portion the on-state corresponding to the period of |ΔTwu| (S27 of FIG. 20). Further, the V-phase voltage waveform corresponding to the third phase becomes the pulse waveform including in its central portion the on-state corresponding to the period of ΔTvw (S28 of FIG. 20).

In the period t3, the absolute value of ΔTuv becomes the largest, and ΔTuv>0 (YES at S22 of FIG. 20). Accordingly, the U-phase voltage waveform, corresponding to the first phase, becomes the pulse waveform including in its central portion the on-state corresponding to the period of ΔTuv (S23 of FIG. 20). Likewise, the V-phase voltage waveform corresponding to the second phase becomes the waveform that remains off through the entire period (S24 of FIG. 20). Further, the W-phase voltage waveform corresponding to the third phase becomes the pulse waveform including in its central portion the on-state corresponding to the period of |ΔTvw| (S25 of FIG. 20).

In the period t4, the absolute value of ΔTvw becomes the largest, and ΔTvw<0 (NO at S22 of FIG. 20). Accordingly, the V-phase voltage waveform, corresponding to the first phase, becomes the waveform that remains off through the entire period (S26 of FIG. 20). Likewise, the W-phase voltage waveform corresponding to the second phase becomes the pulse waveform including in its central portion the on-state corresponding to the period of |ΔTvw| (S27 of FIG. 20). Further, the U-phase voltage waveform corresponding to the third phase becomes the pulse waveform including in its central portion the on-state corresponding to the period of ΔTuv (S28 of FIG. 20).

In the period t5, the absolute value of ΔTwu becomes the largest, and ΔTwu>0 (YES at S22 of FIG. 20). Accordingly, the W-phase voltage waveform, corresponding to the first phase, becomes the pulse waveform including in its central portion the on-state corresponding to the period of ΔTwu (S23 of FIG. 20). Likewise, the U-phase voltage waveform corresponding to the second phase becomes the waveform that remains off through the entire period (S24 of FIG. 20). Further, the V-phase voltage waveform corresponding to the third phase becomes the pulse waveform including in its central portion the on-state corresponding to the period of |ΔTuv| (S25 of FIG. 20).

In the period t6, the absolute value of ΔTuv becomes the largest, and ΔTuv<0 (NO at S22 of FIG. 20). Accordingly, the U-phase voltage waveform, corresponding to the first phase, becomes the waveform that remains off through the entire period (S26 of FIG. 20). Likewise, the V-phase voltage waveform corresponding to the second phase becomes the pulse waveform including in its central portion the on-state corresponding to the period of |ΔTuv| (S27 of FIG. 20). Further, the W-phase voltage waveform corresponding to the third phase becomes the pulse waveform including in its central portion the on-state corresponding to the period of ΔTwu (S28 of FIG. 20). Thereafter, the process of the periods from t1 through t6 is repeated.

Therefore, the switching element in the inverter circuit 2 which receives the input of the PWM signals, including the high level and low level respectively corresponding to the on-state and off-state of those phase voltage waveforms, does not perform the switching action in one-third period of the cycle. Such arrangement provides the same advantageous effects as those offered by the first embodiment.

Also, the transition with time of the pulse width of each pulse waveform corresponding to the U-phase voltage waveform appears as shown in a lower region of FIG. 21. More specifically, the pulse width forms the inverted pattern of the transition with time of the W-phase pulse width ΔTwu (ref. ΔTwu in solid line in the upper region of FIG. 21) through the periods t1 and t2, the same pattern as the transition with time of the U-phase pulse width ΔTuv (ref. ΔTuv in broken line in the upper region of FIG. 21) through the periods t3 and t4, and remains off through the periods t5 and t6.

Further, when the U-phase voltage waveform is input to the inverter circuit 2 as the PWM signal, the waveform of the U-phase output phase voltage output from the filter circuit 3 assumes the waveform in the lower region of FIG. 21. When the V-phase and W-phase voltage waveforms are input as the PWM signals to the inverter circuit 2, the waveforms of the V-phase and W-phase output phase voltages output from the filter circuit 3 assume the waveform in the lower region of FIG. 21, but of the phase advanced and delayed by 2π/3, respectively. These waveforms are identical to those of the phase voltage signal Vu1, Vv1, Vw1 shown in FIG. 5(c). Such arrangement enables, therefore, outputting the balanced line voltage signals to the system 5.

In the fourth embodiment, further, the decided phase voltage waveform always starts from the low level. Accordingly, it is not mandatory that the phase voltage waveform is decided at the start kT of the sampling period, and the pulse width may be calculated based on the line voltage signal to determine the phase voltage waveform, at the start kT of the sampling period. The latter arrangement enables generating the PWM signal with higher accuracy. Also, the decided phase voltage waveform always ends at the low level. Therefore the switching action cannot by made at the boundary of the sampling periods, and hence the switching loss can be suppressed.

The procedure for deciding the phase voltage waveform is not limited to the flowchart of FIG. 20. Other procedures may be adopted, as long as the rule for deciding the waveform can be changed based on the positive and negative distinction of the pulse width value having the largest absolute value.

Although the first to the fourth embodiments refer to the case where the inverter control circuit according to the present invention is incorporated in the utility interactive inverter system, the system may be otherwise arranged. A recording medium such as a ROM retrievably containing the program of generating the PWM signal by the foregoing method may be provided for a computer associated with the conventional inverter control circuit, so that the program can be read out and executed, to provide the function of the inverter control circuit according to the present invention.

The inverter control circuit according to the present invention is not limited to the foregoing embodiments. Specific structure of the constituents of the inverter control circuit according to the present invention may be modified in various manners.

REFERENCE SIGNS

A1, A2, A3, A4 Utility interactive inverter system
1 DC power source
2 Inverter circuit
3 Filter circuit
4 Transformer circuit
5 Commercial power system
6 Inverter control circuit
61 Command signal generation circuit
611 Phase voltage control signal generation circuit
611a Phase detection circuit
611b PI control circuit
611c Three-phase/two-phase conversion circuit
611d Static coordinate conversion circuit
611e PI control circuit
611f Rotating coordinate conversion circuit
611g Two-phase/three-phase conversion circuit
612 Control signal conversion circuit
613, 614 Signal generation circuit
615 Line voltage correction circuit
62, 63 PWM signal generation circuit
7 DC voltage sensor
8 Current sensor
9 Line voltage sensor

The invention claimed is:

1. An inverter control circuit that generates and outputs PWM signals for controlling an operation of a plurality of switching devices in a three-phase inverter circuit,
wherein the PWM signals are configured to ensure that a waveform of a phase voltage outputted from the three-phase inverter circuit through a low-pass filter is zero in a first one-third period of a cycle, is a sine wave corresponding to a phase from 0 to $2\pi/3$ in a subsequent one-third period of the cycle; and is a sine wave corresponding to a phase from $\pi/3$ to $\pi$ in a remaining one-third period of the cycle,
the inverter control circuit comprising:
a target value signal generator that generates a first target value signal, a second target value signal and a third target value signal, the first target value signal having a waveform which is zero in the first one-third period of the cycle, is a sine wave corresponding to a phase from 0 to $2\pi/3$ in the subsequent second one-third period of the cycle, and is a sine wave corresponding to a phase from $\pi/3$ to $\pi$ in the remaining one-third period of the cycle, the second target value signal having a phase advanced by $2\pi/3$ from the first target value signal, the third target value signal having a phase delayed $2\pi/3$ from the first target value signal; and
a PWM signal generator that generates the PWM signals based on the target value signals;
wherein the target value signal generator includes:
a phase voltage control signal generator that generates three phase voltage control signals for controlling the three-phase voltage outputted from the three-phase inverter circuit;
a control signal converter that converts the three phase voltage control signals into the line voltage control signal; and
a signal generator that generates the first to the third target value signals for the respective phases of the three-phase inverter circuit, based on the line voltage control signal.

2. The inverter control circuit according to claim 1, wherein a sine wave signal forming the waveform of the first to the third target value signals is a line voltage control signal having the same waveform as that of a balanced three-phase line voltage signal to be outputted from the three-phase inverter circuit.

3. The inverter control circuit according to claim 1, wherein the signal generator generates the respective target value signals of the phases, by combining two line voltage control signals and a zero signal so as to select a largest value of these three signals, the two line voltage control signals being obtained by subtracting the phase voltage control signal of a phase one sequence anterior to a given phase and that of a phase one sequence posterior to the given phase, respectively, from the phase voltage control signal of the given phase, the zero signal constantly having a value of zero.

4. The inverter control circuit according to claim 1, wherein the signal generator generates the respective target value signals of the phases, the target value signal of a given phase being zero for the first one-third period of the cycle; is the line voltage control signal obtained by subtracting the phase voltage control signal of a phase one sequence anterior to the given phase from the phase voltage control signal of the given phase, for the second one-third period of the cycle; and is the line voltage control signal obtained by subtracting the phase voltage control signal of a phase one sequence posterior to the given phase from the phase voltage control signal of the given phase, for the remaining one-third period of the cycle.

5. The inverter control circuit according to claim 1, wherein the PWM signal generator generates the PWM signal by comparing each of the three target value signals with a predetermined carrier signal, with the zero level of the target value signal matched with a lowest level of amplitude of the carrier signal.

6. A utility interactive inverter system, comprising the inverter control circuit according to claim 1.

7. An inverter control circuit, that generates and outputs PWM signals for controlling an operation of a plurality of switching devices in a three-phase inverter circuit,
wherein the PWM signals are configured to ensure that a waveform of a phase voltage outputted from the three-phase inverter circuit through a low-pass filter is zero in a first one-third period of a cycle, is a sine wave corresponding to a phase from 0 to $2\pi/3$ in a subsequent one-third period of the cycle; and is a sine wave corresponding to a phase from $\pi/3$ to $\pi$ in a remaining one-third period of the cycle,
the inverter control circuit comprising:
a target value signal generator that generates a first target value signal, a second target value signal and a third target value signal, the first target value signal having a waveform which is zero in the first one-third period of the cycle, is a sine wave corresponding to a phase from 0 to $2\pi/3$ in the subsequent second one-third period of the cycle, and is a sine wave corresponding to a phase from $\pi/3$ to $\pi$ in the remaining one-third period of the cycle, the second target value signal having a phase advanced by $2\pi/3$ from the first target value signal, the third target value signal having a phase delayed $2\pi/3$ from the first target value signal; and
a PWM signal generator that generates the PWM signals based on the target value signals;
wherein the target value signal generator includes:
a phase voltage control signal generator that generates three phase voltage control signals for controlling the three-phase output voltage output from the three-phase inverter circuit; and a signal generator that generates the first to the third target value signals for the respective phases of the three-phase inverter circuit, from the three phase voltage control signals;

wherein, for the period where the first target value signal becomes zero, the signal generator generates:

the first target value signal by subtracting the first phase voltage control signal from the first phase voltage control signal of the phase corresponding to the first phase voltage control signal, the second target value signal by subtracting the first phase voltage control signal from the second phase voltage control signal of the phase corresponding to the second target value signal, and the third target value signal by subtracting the first phase voltage control signal from the third phase voltage control signal of the phase corresponding to the third target value signal;

wherein, for the subsequent one-third period following the zero period, the signal generator generates:

the first target value signal by subtracting the third phase voltage control signal from the first phase voltage control signal, the second target value signal by subtracting the third phase voltage control signal from the second phase voltage control signal, and the third target value signal by subtracting the third phase voltage control signal from the third phase voltage control signal; and wherein, for the remaining one-third period of the cycle, the signal generator generates:

the first target value signal by subtracting the second phase voltage control signal from the first phase voltage control signal, the second target value signal by subtracting the second phase voltage control signal from the second phase voltage control signal, and the third target value signal by subtracting the second phase voltage control signal from the third phase voltage control signal.

8. The inverter control circuit according to claim 7, wherein the PWM signal generator generates the PWM signal by comparing each of the three target value signals with a predetermined carrier signal, with the zero level of the target value signal matched with a lowest level of amplitude of the carrier signal.

9. A utility interactive inverter system, comprising the inverter control circuit according to claim 7.

10. An inverter control circuit that generates and outputs PWM signals for controlling an operation of a plurality of switching devices in a three-phase inverter circuit, wherein the PWM signals are configured to ensure that a waveform of a phase voltage outputted from the three-phase inverter circuit through a low-pass filter is zero in a first one-third period of a cycle, is a sine wave corresponding to a phase from 0 to $2\pi/3$ in a subsequent one-third period of the cycle; and is a sine wave corresponding to a phase from $\pi/3$ to $\pi$ in a remaining one-third period of the cycle, the inverter control circuit comprising:

a calculator that calculates three pulse width values whose absolute value represents a pulse width and whose polarity represents a polarity of a waveform to be utilized for controlling the voltage between the respective output lines of the phases outputted by the three-phase inverter circuit of each sampling period;

a determiner that determines whether the pulse width value of a largest absolute value among the three pulse width values calculated by the calculator is larger than zero; and a PWM signal generator that decides a waveform of each phase of the sampling period, according to a first predetermined rule in the case where the pulse width value of the largest absolute value is larger than zero, and according to a rule different from the first predetermined rule in the case where the pulse width value of the largest absolute value is smaller than zero, to generate the PWM signal.

11. The inverter control circuit according to claim 10, wherein the PWM signal generator forms, in the case where the pulse width value of the largest absolute value is larger than zero:

for a first phase where the pulse width value has the largest absolute value, a pulse waveform that includes in its central portion an on-state corresponding to the period of the pulse width value of the first phase, for a second phase following the first phase, a waveform that remains off of through an entire period, and for a third phase following the second phase, a pulse waveform that includes in its central portion an on-state corresponding to the period of the absolute value of the pulse width value of the second phase; and in the case where the pulse width value of the largest absolute value is smaller than zero:

for the first phase a waveform that remains off through the entire period, for the second phase a pulse waveform that includes in its central portion the on-state corresponding to the period of the absolute value of the pulse width value of the first phase, and for the third phase a pulse waveform that includes in its central portion the on-state corresponding to the period of the pulse width value of the third phase.

12. A utility interactive inverter system, comprising the inverter control circuit according to claim 10.

* * * * *